US011490097B2

(12) United States Patent
Chen et al.

(10) Patent No.: US 11,490,097 B2
(45) Date of Patent: Nov. 1, 2022

(54) METHOD AND APPARATUS FOR SIGNALING SUBPICTURE PARTITIONING INFORMATION

(71) Applicant: ALIBABA GROUP HOLDING LIMITED, Grand Cayman (KY)

(72) Inventors: Jie Chen, Beijing (CN); Yan Ye, San Diego, CA (US); Jiancong Luo, Skillman, NJ (US); Ru-Ling Liao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/127,024

(22) Filed: Dec. 18, 2020

(65) Prior Publication Data

US 2021/0203959 A1    Jul. 1, 2021

Related U.S. Application Data

(60) Provisional application No. 62/954,014, filed on Dec. 27, 2019.

(51) Int. Cl.
*H04N 19/136* (2014.01)
*H04N 19/184* (2014.01)
*H04N 19/176* (2014.01)
*H04N 19/172* (2014.01)
*H04N 19/117* (2014.01)

(52) U.S. Cl.
CPC ......... *H04N 19/184* (2014.11); *H04N 19/117* (2014.11); *H04N 19/136* (2014.11); *H04N 19/172* (2014.11); *H04N 19/176* (2014.11)

(58) Field of Classification Search
None
See application file for complete search history.

(56) References Cited

U.S. PATENT DOCUMENTS

2016/0212439 A1   7/2016  Hannuksela
2021/0136420 A1 * 5/2021  Lai ..................... H04N 19/184
(Continued)

FOREIGN PATENT DOCUMENTS

WO   WO 2018/177819 A1   10/2018
WO   WO 2019/194241 A1   10/2019
WO   WO 2019/195035 A1   10/2019

OTHER PUBLICATIONS

PCT International Search Report and Written Opinion dated Mar. 23, 2021, issued in corresponding International Application No. PCT/US2020/066009 (14 pgs.).
(Continued)

*Primary Examiner* — Christopher G Findley
(74) *Attorney, Agent, or Firm* — Finnegan, Henderson, Farabow, Garrett & Dunner, LLP

(57) ABSTRACT

The present disclosure provides methods and apparatuses for signaling subpicture partitioning information. An exemplary method includes: determining, according to a subpicture information present flag signaled in a bitstream, whether the bitstream comprises subpicture information; and in response to the bitstream comprising the subpicture information, signaling in the bitstream at least one of: a number of subpictures in a picture, a width, a height, a position, and an identifier (ID) mapping of a target subpicture, a subpic_treated_as_pic_flag, and a loop_filter_across_subpic_enabled_flag.

18 Claims, 24 Drawing Sheets

Example Of A Picture Partitioned Into 28 Subpictures

(56) References Cited

U.S. PATENT DOCUMENTS

2021/0195223 A1*  6/2021  Chang .................. H04N 19/587
2021/0409684 A1* 12/2021  Wang .................... G06V 20/49

OTHER PUBLICATIONS

"Requirements for a Future Video Coding Standard v5," International Organisation for Standardisation, Torino, IT, 14 pages (2017).
Bross et al., "Versatile Video Coding (Draft 7), "JVET-P2001-vE, 16$^{th}$ Meeting: Geneva, CH, Oct. 1-11, 2019, 488 pages.
Chen et al., Algorithm description for Versatile Video Coding and Test Model 7 (VTM 7), JVET-P2002-v1, 16$^{th}$ Meeting: Geneva, CH Oct. 1-11, 2019, 89 pages.
Chen et al., "Algorithm Description of Joint Exploration Test Model 7 (JEM 7)," JVET-G1001-v1, 7$^{th}$ Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

Example Of A Picture Divided Into CTUs

Example Of A Picture Partitioned Into Tiles And Reaster-Scan Slices

Example Of A Picture Partitioned Into Tiles And Rectangular Slices

Example Of A Picture Partitioned Into 4 Tiles And 4 Rectangular Slices

Example Of A Picture Partitioned Into 28 Subpictures

Table 1: Exemplary SPS syntax of subpicture partitioning

| seq_parameter_set_rbsp( ) { | Descriptor |
|---|---|
| ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
| | |

FIG. 10

Table 2: Exemplary SPS syntax of subpicture identifier

| seq_parameter_set_rbsp( ) { | Descriptor |
|---|---|
| ... | |
|   sps_subpic_id_present_flag | u(1) |
|   if( sps_subpic_id_present_flag ) { | |
|     sps_subpic_id_signalling_present_flag | u(1) |
|     if( sps_subpic_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |

FIG. 11

Table 3: Exemplary PPS syntax of subpicture identifier

| pic_parameter_set_rbsp( ) { | Descriptor |
|---|---|
| ... | |
|   pps_subpic_id_signalling_present_flag | u(1) |
|   if( pps_subpic_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |

FIG. 12

Table 4: Exemplary PH syntax of subpicture identifier

| picture_header_rbsp( ) { | Descriptor |
|---|---|
| ... | |
|   if( sps_subpic_id_present_flag && !sps_subpic_id_signalling_present_flag ) { | |
|     ph_subpic_id_signalling_present_flag | u(1) |
|     if( ph_subpic_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |

FIG. 13

Table 5: Exemplary PH syntax of subpicture identifier

| picture_header_rbsp( ) { | Descriptor |
|---|---|
| ... | |
| if( sps_subpic_id_present_flag && !sps_subpic_id_signalling_present_flag ) { | |
|    *if(pps_subpic_id_signalling_present_flag)* | |
|    ph_subpic_id_signalling_present_flag | u(1) |
|    if( ph_subpic_id_signalling_present_flag ) { | |
|      ph_subpic_id_len_minus1 | ue(v) |
|      for( i = 0; i <= sps_num_subpics_minus1; i++ ) | |
|        ph_subpic_id[ i ] | u(v) |
|    } | |
| } | |

Table 6: Exemplary PH syntax of subpicture identifier

| picture_header_rbsp( ) { | Descriptor |
|---|---|
| ... | |
| if( sps_subpic_id_present_flag && !sps_subpic_id_signalling_present_flag )<br>&& *!pps_subpic_id_signalling_present_flag* ) { | |
|    ph_subpic_id_len_minus1 | ue(v) |
|    for( i = 0; i <= sps_num_subpics_minus1; i++ ) | |
|      ph_subpic_id[ i ] | u(v) |
| } | |

Table 7A: Exemplary SPS syntax

| seq_parameter_set_rbsp( ) { | Descriptor |
|---|---|
| ... | |
|   subpics_present_flag | u(1) |
|   if( subpics_present_flag ) { | |
|     sps_num_subpics_minus1 | u(8) |
|     *if(sps_num_subpics_minus1>0){* | |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|     *}* | |
|   } | |

1701 — row with *if(sps_num_subpics_minus1>0){*
1702 — row with *}*

FIG. 17A

Table 7B: Exemplary SPS syntax

| seq_parameter_set_rbsp( ) { | Descriptor |
|---|---|
| ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       *if(sps_num_subpics_minus1>0){* | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|       *}* | |
|     } | |
|   } | |
| ... | |

1711 — row with *if(sps_num_subpics_minus1>0){*
1712 — row with *}*

FIG. 17B

Table 8: Exemplary SPS syntax

| seq_parameter_set_rbsp( ) { | Descriptor |
|---|---|
| ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       *if(sps_num_subpic_minus1>0){* | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       *}* | |
|       subpic_treated_as_pic_flag[ i ] | u(1) |
|       loop_filter_across_subpic_enabled_flag[ i ] | u(1) |
|     } | |
|   } | |
| | |

(1801 marks the *if(sps_num_subpic_minus1>0){* line; 1802 marks the closing *}* line)

FIG. 18

Table 9: Exemplary SPS syntax

| seq_parameter_set_rbsp( ) { | Descriptor |
|---|---|
| ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       *if(i!=sps_num_subpics_minus1){* | |
|       subpic_width_minus1[ i ] | u(v) |
|       subpic_height_minus1[ i ] | u(v) |
|       *}* | |
|       subpic_treated_as_pic_flag[ i ] | u(1) |
|       loop_filter_across_subpic_enabled_flag[ i ] | u(1) |
|     } | |
|   } | |
| } | |

1901 — (row with *if(i!=sps_num_subpics_minus1){*)
1902 — (row with *}*)

FIG. 19

Table 10: Exemplary SPS syntax

| seq_parameter_set_rbsp( ) { | Descriptor |
|---|---|
| ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpic_id_present_flag ) { | |
|     sps_subpic_id_signalling_present_flag | u(1) |
|     if( sps_subpic_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
| } | |
| ... | |

2001 (marker at first closing brace block)
2002 (marker at final closing brace)

FIG. 20

METHOD AND APPARATUS FOR SIGNALING SUBPICTURE PARTITIONING INFORMATION

CROSS-REFERENCE TO RELATED APPLICATIONS

The present disclosure claims priority to U.S. Provisional Application No. 62/954,014, filed on Dec. 27, 2019, which is incorporated herein by reference in its entirety.

TECHNICAL FIELD

The present disclosure generally relates to video processing, and more particularly, to methods and apparatuses for signaling subpicture partitioning information.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard. AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

In some embodiments, an exemplary method for signaling subpicture partitioning information includes: determining, according to a subpicture information present flag signaled in a bitstream, whether the bitstream comprises subpicture information; and in response to the bitstream comprising the subpicture information, signaling in the bitstream at least one of: a number of subpictures in a picture, a width, a height, a position, and an identifier (ID mapping of a target subpicture, a subpic_treated_as_pic_flag, and a loop_filter_across_subpic_enabled_flag.

In some embodiments, an exemplary video processing apparatus includes at least one memory for storing instructions and at least one processor. The at least one processor is configured to execute the instructions to cause the apparatus to perform: determining, according to a subpicture information present flag signaled in a bitstream, whether the bitstream comprises subpicture information; and in response to the bitstream comprising the subpicture information, signaling in the bitstream at least one of: a number of subpictures in a picture, a width, a height, a position, and an identifier (ID) mapping of a target subpicture, a subpic_treated_as_pic_flag, and a loop_filter_across_subpic_enabled_flag.

In some embodiments, an exemplary non-transitory computer readable storage medium stores a set of instructions. The set of instructions are executable by one or more processing devices to cause a video processing apparatus to perform: determining, according to a subpicture information present flag signaled in a bitstream, whether the bitstream comprises subpicture information; and in response to the bitstream comprising the subpicture information, signaling in the bitstream at least one of: a number of subpictures in a picture, a width, a height, a position, and an identifier (ID) mapping of a target subpicture, a subpic_treated_as_pic_flag, and a loop_filter_across_subpic_enabled_flag.

BRIEF DESCRIPTION OF THE DRAWINGS

Embodiments and various aspects of the present disclosure are illustrated in the following detailed description and the accompanying figures. Various features shown in the figures are not drawn to scale.

FIG. 10 illustrates an exemplary Table 1 showing exemplary sequence parameter set (SPS) syntax of subpicture partitioning, according to some embodiments of the present disclosure.

FIG. 11 illustrates an exemplary Table 2 showing exemplary SPS syntax of subpicture identifier, according to some embodiments of the present disclosure.

FIG. 12 illustrates an exemplary Table 3 showing exemplary picture parameter set (PPS) syntax of subpicture identifier, according to some embodiments of the present disclosure.

FIG. 13 illustrates an exemplary Table 4 showing exemplary picture header (PH) syntax of subpicture identifier, according to some embodiments of the present disclosure.

FIG. 15 illustrates an exemplary Table 5 showing another exemplary PH syntax of subpicture identifier, according to some embodiments of the present disclosure.

FIG. 16 illustrates an exemplary Table 6 showing another exemplary PH syntax of subpicture identifier, according to some embodiments of the present disclosure.

FIG. 17A illustrates an exemplary Table 7A showing an exemplary SPS syntax, according to some embodiments of the present disclosure.

FIG. 17B illustrates an exemplary Table 7B showing another exemplary SPS syntax, according to some embodiments of the present disclosure.

FIG. 18 illustrates an exemplary Table 8 showing another exemplary SPS syntax, according to some embodiments of the present disclosure.

FIG. 19 illustrates an exemplary Table 9 showing another exemplary SPS syntax, according to some embodiments of the present disclosure.

FIG. 20 illustrates an exemplary Table 10 showing another exemplary SPS syntax, according to some embodiments of the present disclosure.

DETAILED DESCRIPTION

Figure 1:
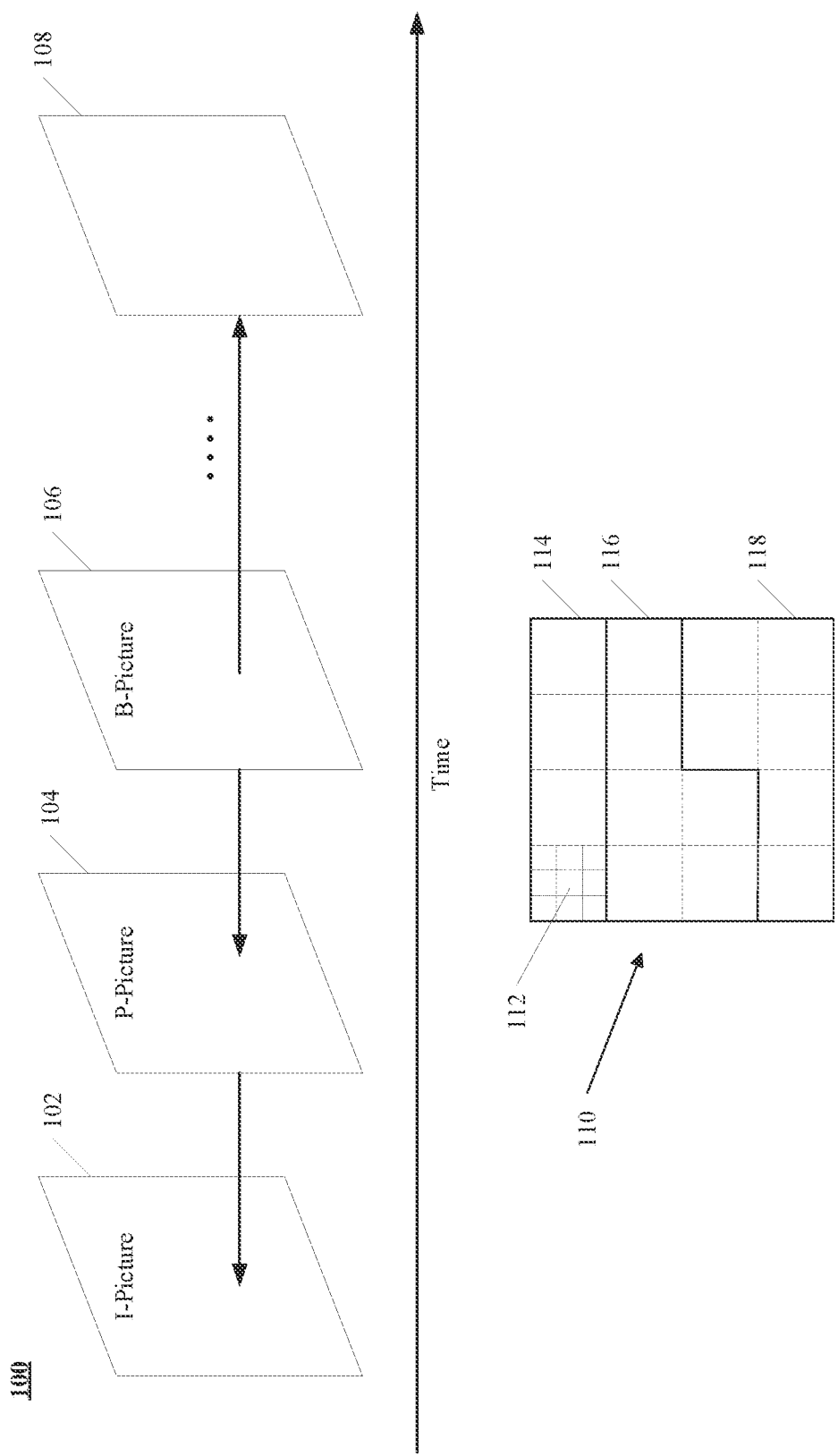
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/TEC MPEG) is currently developing the Versatile Video Coding (VVC/H.266) standard. The VVC standard is aimed at doubling the compression efficiency of its predecessor, the High Efficiency Video Coding (HEAT/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the SEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure, in some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing s b-unit can be repeatedly performed to each of its luma and chroma components. It should be noted that such division can be performed to further levels depending on processing needs. It should also be noted that different stages can divide the basic processing units using different schemes.

Figure 2A:
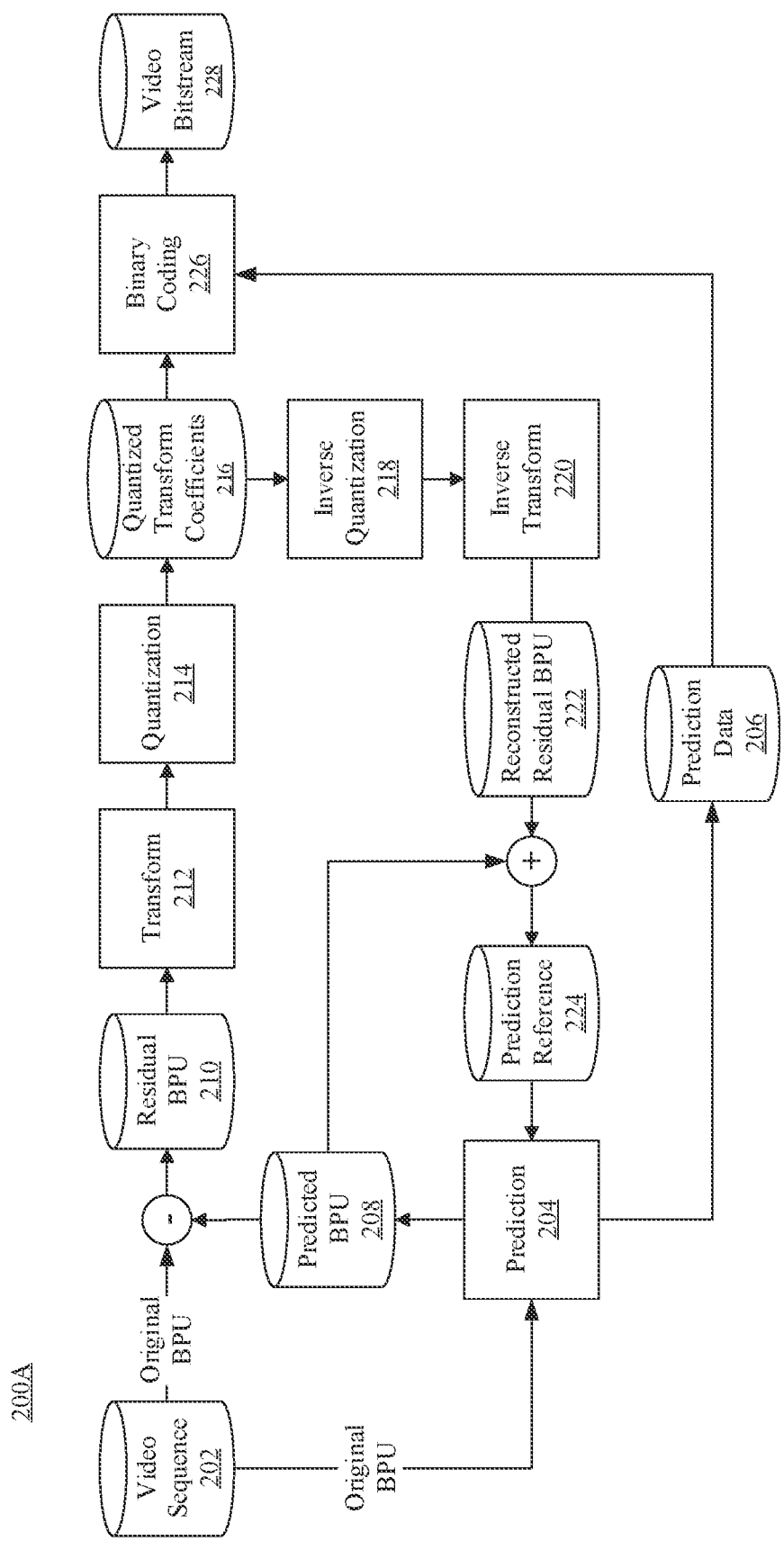
FIG. 2A illustrates a schematic diagram of an exemplary encoding process of a hybrid video coding system, consistent with embodiments of the disclosure.
Figure 2B:
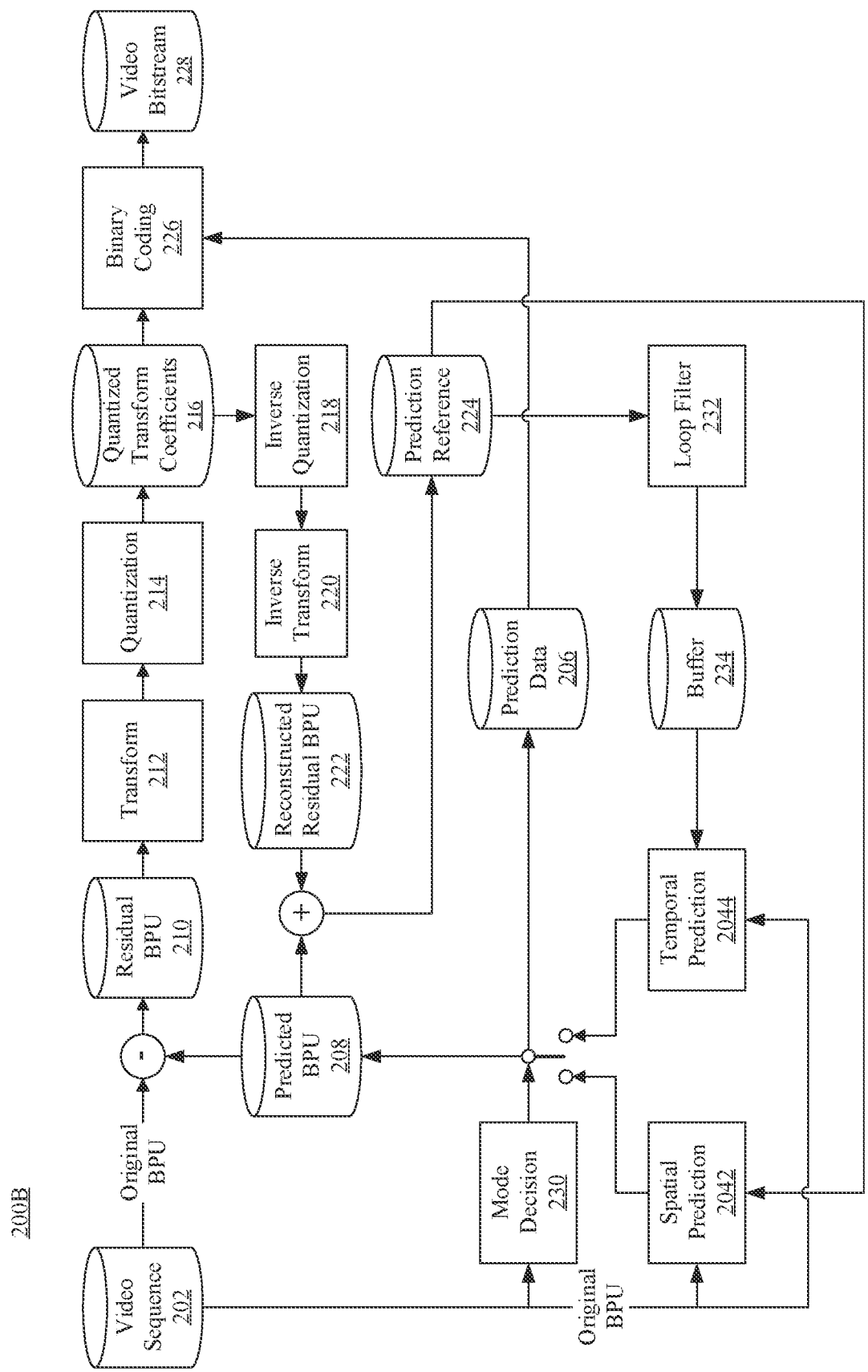
FIG. 2B illustrates a schematic diagram of another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RUB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-tight of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path. In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
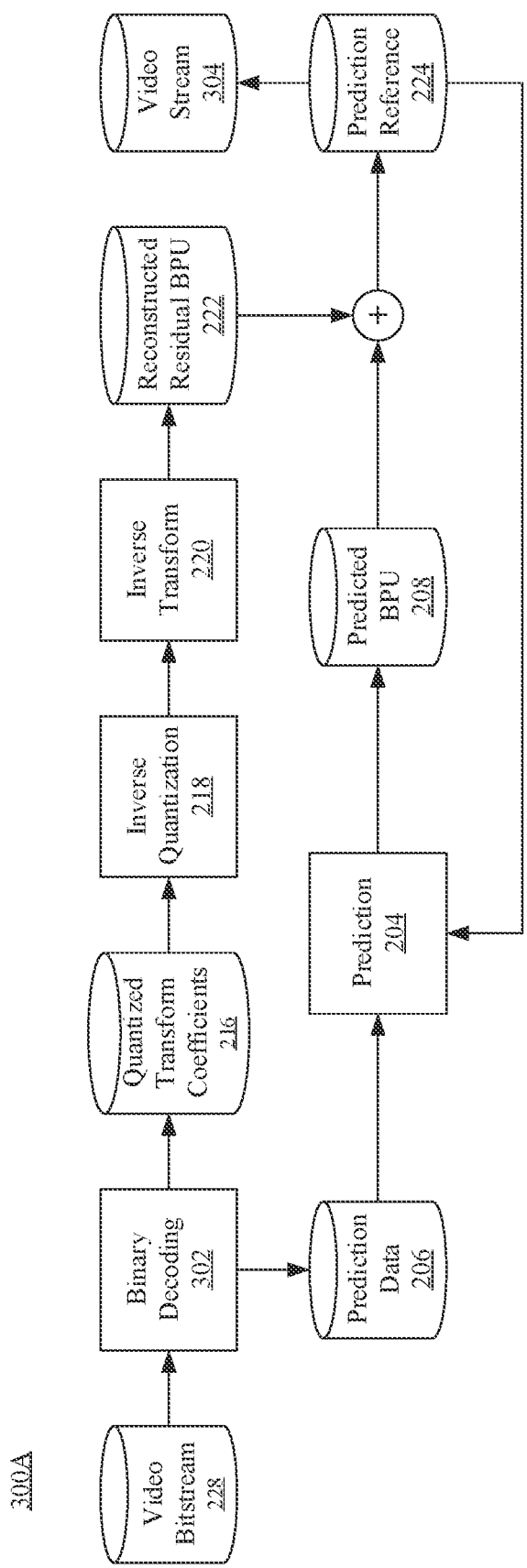
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
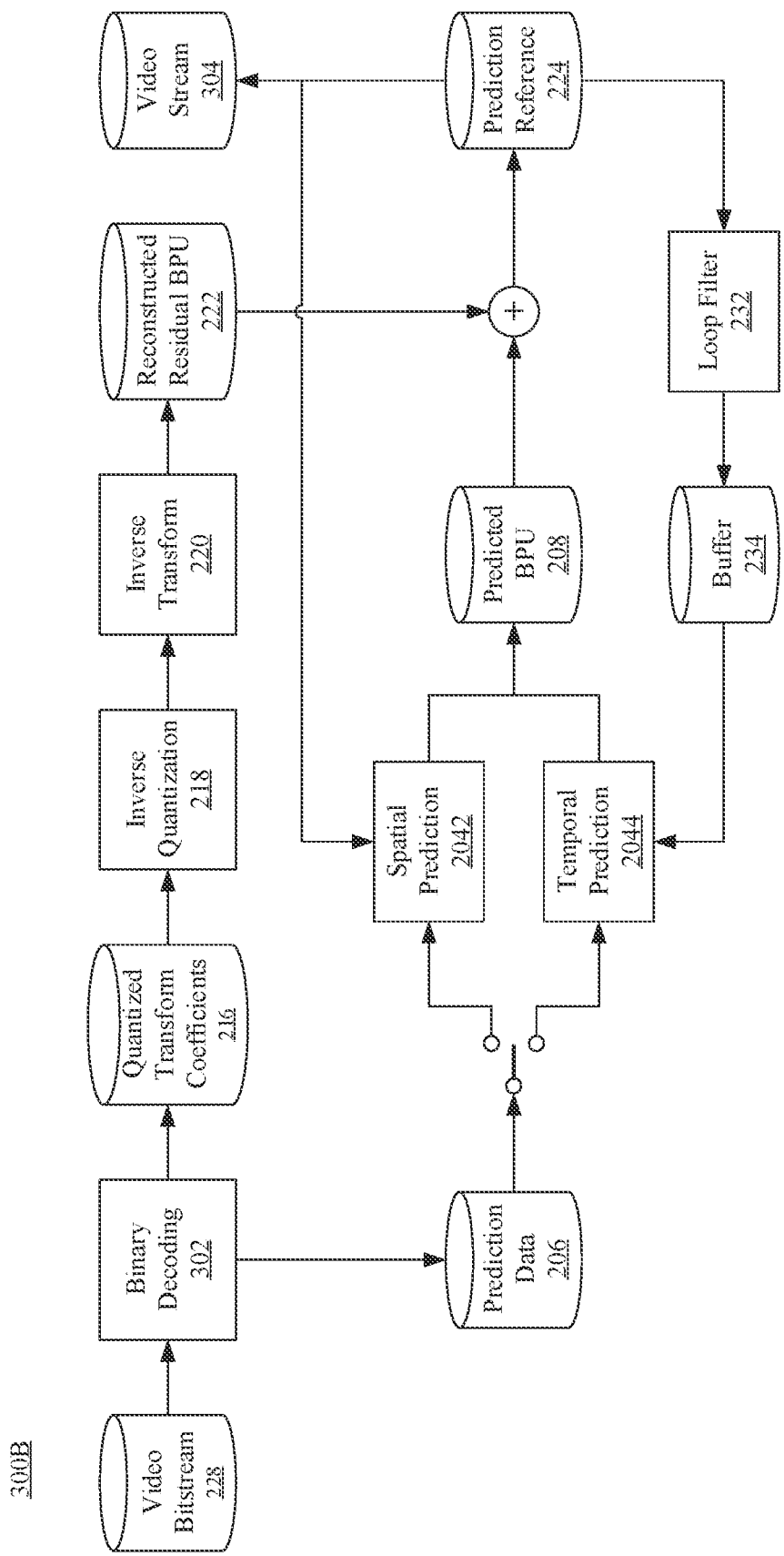
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture) If the current BPU is decoded using the inter prediction at temporal prediction stage 2044, after generating prediction reference 224 (e.g., a reference picture in which all BPU have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
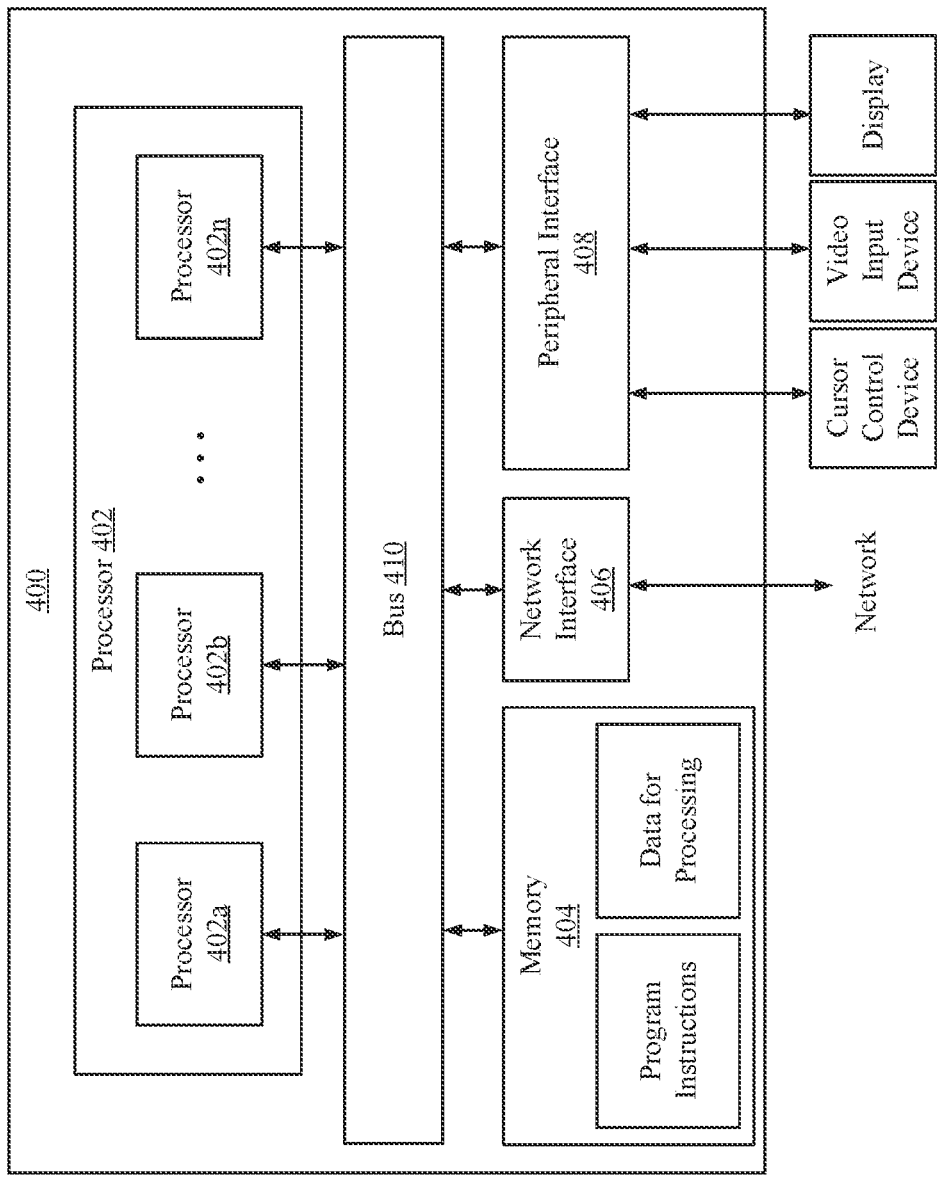
FIG. 4 illustrates a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("ITU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, al local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice may be signaled at the high level, for example, using init_qp_minus26 syntax element in the Picture Parameter Set (PPS) and using slice_qp_delta syntax element in the slice header. Further, the QP values may be adapted at the local level for each CU using delta QP values sent at the granularity of quantization groups.

Figure 5:
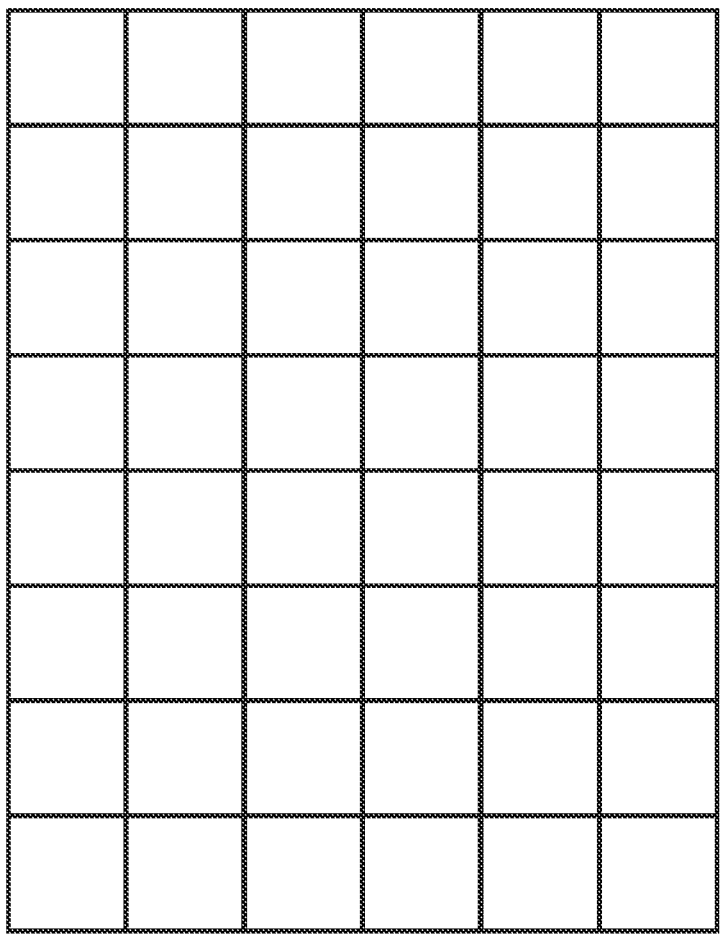
FIG. 5 is a schematic diagram illustrating an example of a picture divided into coding tree units (CTUs), according to some embodiments of the present disclosure.

In the disclosed embodiments, to encode a frame, a picture is partitioned into a sequence of coding tree units (CTUs). Multiple CTUs can form a tile, a slice, or a subpicture. Pictures are divided into a sequence of CTUs. For a picture that has three sample arrays, a CTU consists of an N×N block of luma samples together with two corresponding blocks of chroma samples. FIG. 5 illustrates an example of a picture divided into a plurality of CTUs, according to some embodiments of the present disclosure.

According to some embodiments, the maximum allowed size of the luma block in a CTU is specified to be 128×128 (although the maximum size of the luma transform blocks may be 64×64) and the minimum allowed size of the luma block in a CM is specified to be 32×32.

A picture is divided into one or more tile rows and one or more tile columns. A tile is a sequence of CTUs that covers a rectangular region of a picture. A slice incudes an integer number of complete tiles or an integer number of consecutive complete CUT rows within a tile of a picture. Two modes of slices can be supported: the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 6:
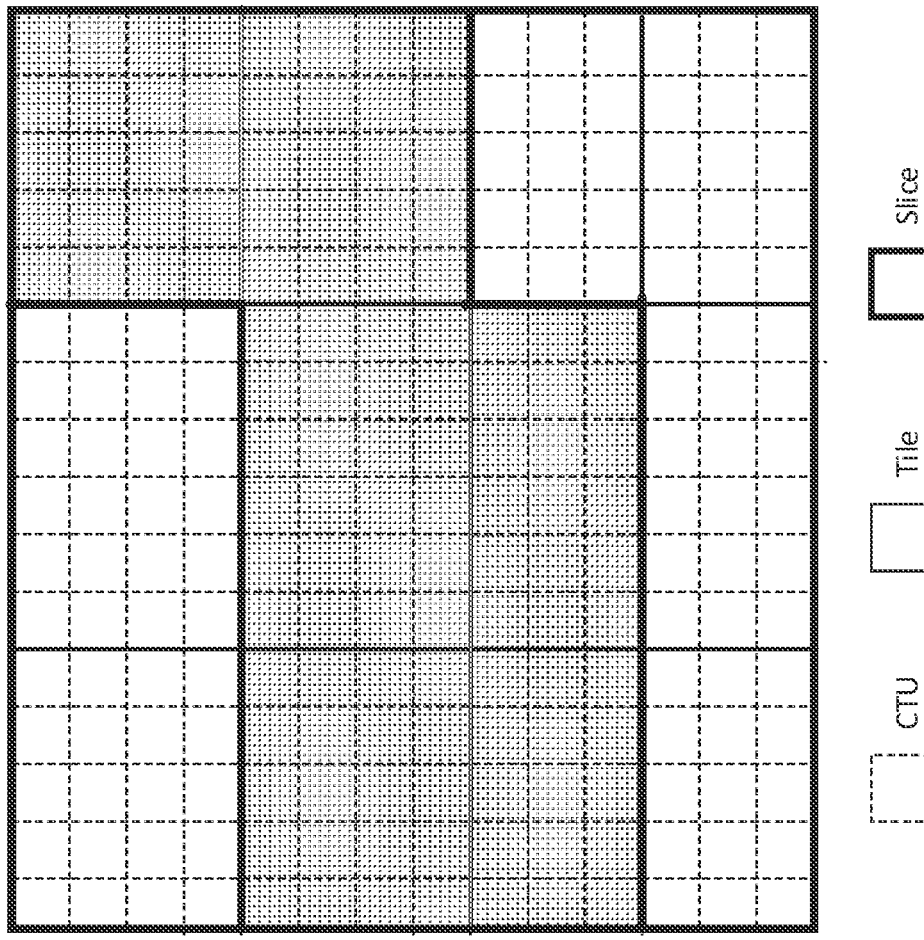
FIG. 6 is a schematic diagram illustrating an example of a picture partitioned into tiles and raster-scan slices, according to some embodiments of the present disclosure.

FIG. 6 illustrates an example of a picture partitioned into tiles and raster-scan slices, according to some embodiments of the present disclosure. As shown in FIG. 6, the picture is divided into 12 tiles (4 tile rows and 3 tile columns) and 3 raster-scan slices.

Figure 7:
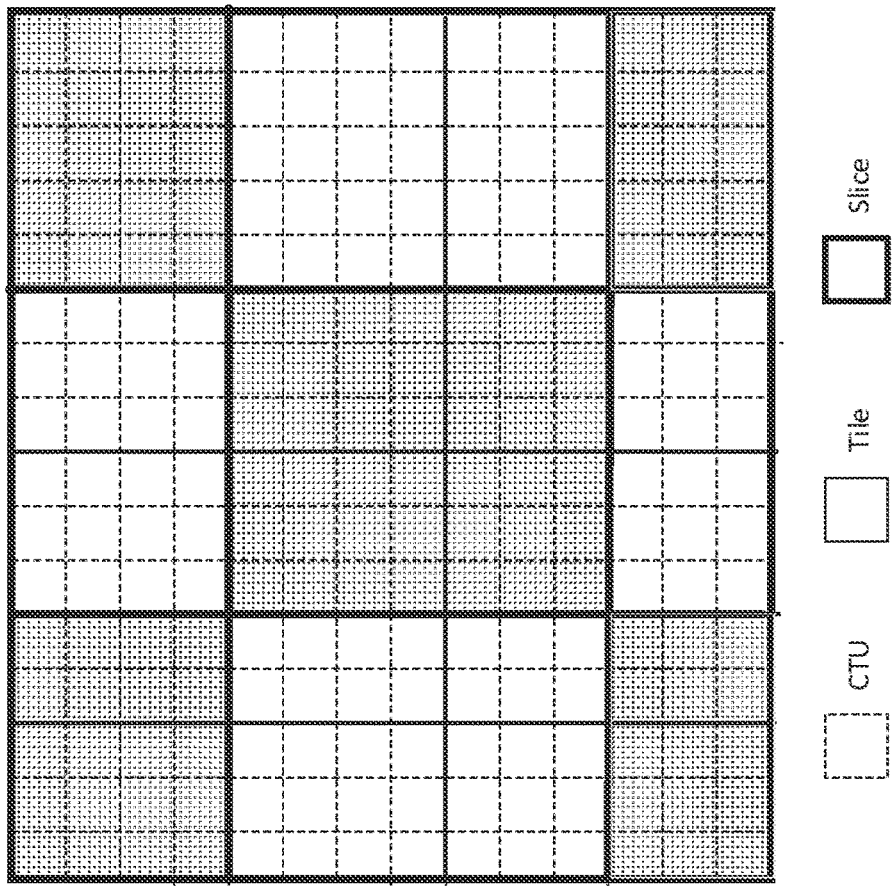
FIG. 7 is a schematic diagram illustrating an example of a picture partitioned into tiles and rectangular slices, according to some embodiments of the present disclosure.

FIG. 7 illustrates an example of a picture partitioned into tiles and rectangular slices, according to some embodiments of the present disclosure. As shown in FIG. 7, the picture is divided into 20 tiles (5 tile columns and 4 tile rows) and 9 rectangular slices.

Figure 8:
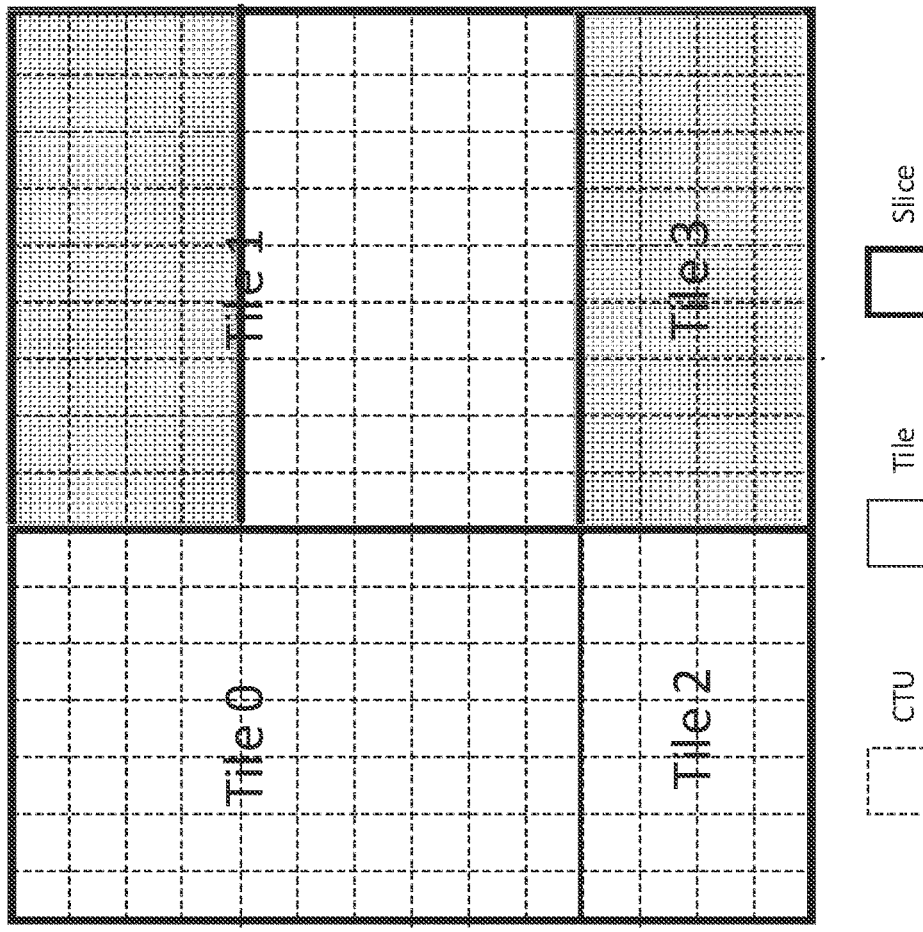
FIG. 8 is a schematic diagram illustrating another example of a picture partitioned into tiles and rectangular slices, according to some embodiments of the present disclosure.

FIG. 8 illustrates another example of a picture partitioned into tiles and rectangular slices, according to some embodiments of the present disclosure. As shown in FIG. 8, the picture is divided into 4 tiles (2 tile columns and 2 tile rows) and 4 rectangular slices.

Figure 9:
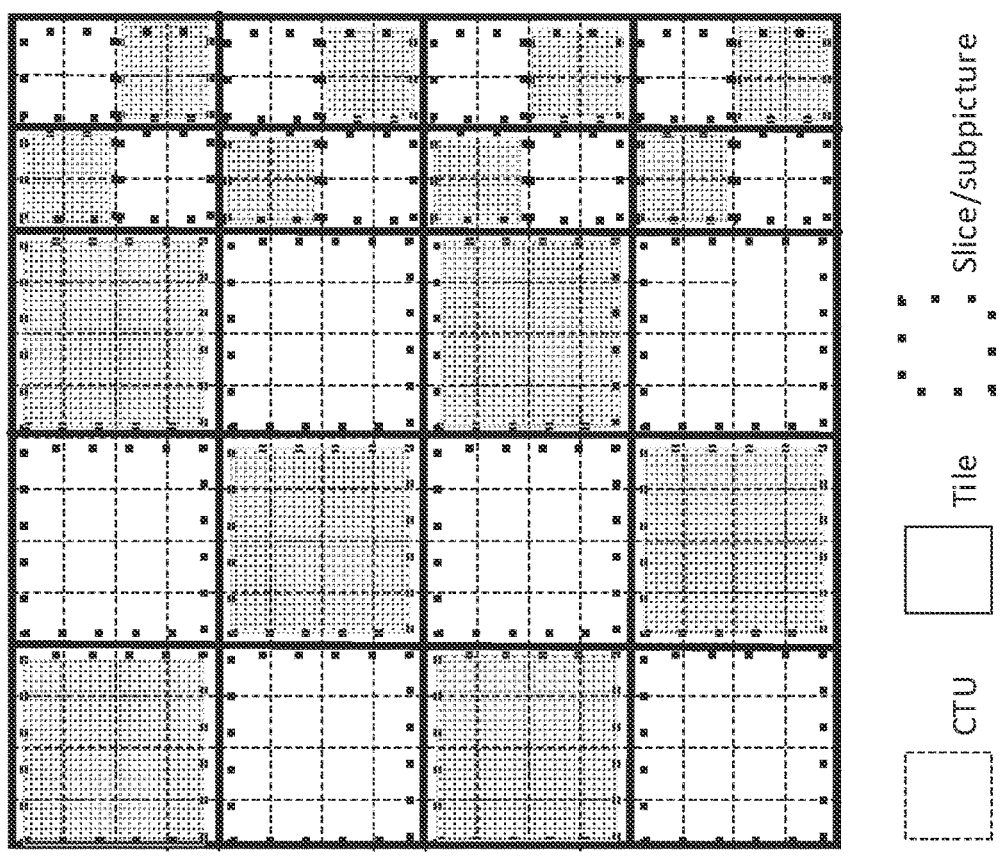
FIG. 9 is a schematic diagram illustrating an example of a picture partitioned into subpictures, according to some embodiments of the present disclosure.

FIG. 9 illustrates an example of a picture partitioned into subpictures, according to some embodiments of the present disclosure. As shown in FIG. 9, the picture is partitioned into 20 tiles (5 tile columns and 4 tile rows), 12 on the left-hand side each covering one slice of 4 by 4 CTUs and 8 tiles on the right-hand side each covering 2 vertically-stacked slices of 2 by 2. CTUs, altogether resulting in 28 slices and 28 subpictures of varying dimensions (each slice is a subpicture).

According to some disclosed embodiments, the subpicture partitioning information is signaled in sequence parameter set (SPS). FIG. 10 illustrates an exemplary Table 1 showing exemplary SPS syntax of subpicture partitioning, according to some embodiments of the present disclosure.

In Table 1, syntax element sps_num_subpics_minus1 plus 1 specifies the number of subpictures in one picture, syntax elements subpic_ctu_top_left_x[i] and subpic_ctu_top_left_y[i] specify the position of top left CTU of subpicture in unit of CtbSizeY, and syntax element subpic_width_minus1[i] plus 1 and syntax element subpic_height_minus1[i] plus 1 specify the width and height of the i-th subpicture in units of CtbSizeY, respectively. The semantics of these syntax elements are as follows.

subpics_present_flag equal to 1 specifies that subpicture parameters are present in the SPS RBSP syntax; subpics_present_flag equal to 0 specifies that subpicture parameters are not present in the SPS RBSP syntax.

sps_raum_subpics_minus1 plus 1 specifies the number of subpictures. Syntax element sps_num_subpics_minus1 is in the range of 0 to 254. When not present, the value of syntax element sps_num_subpics_minus1 is inferred to be equal to 0.

subpic_ctu_top_left_x[i] specifies horizontal position of top left CTU of i-th subpicture in unit of CtbSizeY. The length of the syntax element is Ceil(Log 2(pic_width_max_in_luma_samples÷CtbSizeY)) bits. When not present, the value of syntax element subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log 2(pic_width_max_in_luma_samples÷CtbSizeY)) bits. When not present, the value of syntax element subpic_ctu_top_left_y[i] is inferred to be equal to 0.

subpic_width_minus1[i] plus 1 specifies the width of the i-th subpicture in units of CtbSizeY. The length of the syntax element is Ceil(Log 2(pic_width_max_in_luma_samples÷CtbSizeY)) bits. When not present, the value of syntax element subpic_width_minus1[i] is inferred to be equal to Ceil (pic_width_max_in_luma_samples÷CtbSizeY)−1.

subpic_height_minus1[i] plus 1 specifies the height of the i-th subpicture in units of CtbSizeY. The length of the syntax element is Ceil(Log 2(pic_height_max_in_luma_samples÷CtbSizeY)) bits. When not present, the value of syntax element subpic_height_minus1[i] is inferred to be equal to Ceil (pic_height_max_in_luma_samples÷CtbSizeY)−1.

subpic_treated_as_pic_flag[i] equal to 1 specifies that the i-th subpicture of each coded picture in the coded layer video sequence (CLVS) is treated as a picture in the decoding process excluding in-loop filtering operations. Syntax element subpic_treated_as_pic_flag[i] equal to 0 specifies that the i-th subpicture of each coded picture in the CLVS is not treated as a picture in the decoding process excluding in-loop filtering operations. When not present, the value of syntax element subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CLVS. Syntax element, loop_filter_across_subpic_enabled_flag[i] equal to 0 specifies that in-loop filtering operations are not performed across the boundaries of the i-th subpicture in each coded picture in the CLVS. When not present, the value of syntax element loop_filter_across_subpic_enabled_pic_flag[i] is inferred to be equal to 1.

Consistent with the disclosed embodiments of the present disclosure, each subpicture may be assigned with an identifier. The identifier information of the subpictures may be signaled in Sequence parameter set (SPS), Picture parameter set (PPS) or Picture header (PH). FIG. 11 illustrates an exemplary Table 2 showing exemplary SPS syntax of subpicture identifier, according to some embodiments of the present disclosure. FIG. 12 illustrates an exemplary Table 3 showing exemplary PPS syntax of subpicture identifier, according to some embodiments of the present disclosure. FIG. 13 illustrates an exemplary Table 4 showing exemplary PH syntax of subpicture identifier, according to some embodiments of the present disclosure.

As shown in Tables 2-4, Syntax element sps_subpic_id_present_flag indicates whether subpicture ID mapping is present in SPS; syntax elements sps_subpic_id_signaling_present_flag, pps_subpic_id_signaling_present_flag and ph_subpic_id_signaling_present_flag indicate whether subpicture ID mapping is signaled in SPS, PPS or PH, respectively; syntax element sps_subpic_id_len_minus1 plus 1, syntax element pps_subpic_id_len_minus1 plus 1 and syntax element ph_subpic_id_len_minus1 plus 1 specify, the number of bits used to present the syntax elements sps_subpic_id[i], pps_subpic_id[i] and ph_subpic_id[i], respectively, which are subpicture ID signaled in SPS, PPS and PH, respectively.

The semantics of the above syntax elements and related bitstream conformance requirement are described as follows.

sps_subpic_id_present_flag equal to 1 specifies that subpicture ID mapping is present in the SPS; syntax element sps_subpic_id_present_flag equal to 0 specifies that subpicture ID mapping is not present in the SPS.

sps_subpic_id_signaling_present_flag equal to 1 specifies that subpicture ID mapping is signaled in the SPS, syntax element sps_subpic_id_signaling_present_flag equal to 0 specifies that subpicture ID mapping is not signaled in the SPS. When not present, the value of syntax element sps_subpic_id_signaling_present_flag is inferred to be equal to 0.

sps_subpic_id_len_minus1 plus 1 specifies the number of bits used to represent the syntax element sps_subpic_id[i]. The value of syntax element sps_subpic_id_len_minus1 can be in the range of 0 to 15, inclusive.

sps_subpic_id[i] specifies that subpicture ID of the i-th subpicture. The length of the syntax element sps_subpic_id [i] is sps_subpic_id_len_minus1+1 bits. When not present, and when syntax element sps_subpic_id_present_flag equal to 0, the value of syntax element sps_subpic_id[i] is inferred to be equal to i, for each i in the range of 0 to sps_num_subpics_minus1, inclusive.

pps_subpic_id_signaling_present_flag equal to 1 specifies that subpicture ID mapping is signaled in the PPS. syntax element pps_subpic_id_signaling_present_flag equal to 0 specifies that subpicture ID mapping is not signaled in the PPS. When syntax element sps_subpic_id_present_flag is 0 or syntax element sps_subpic_id_signaling_present_flag is equal to 1, syntax element pps_subpic_id_signaling_present_flag can be equal to 0.

pps_num_subpics_minus1 plus 1 specifies the number of subpictures in the coded pictures referring to the PPS. It can a requirement of bitstream conformance that the value of syntax element pps_num_subpic_minus1 is equal to syntax element sps_num_subpics_minus1.

pps_subpic_id_len_minus1 plus 1 specifies the number of bits used to represent the syntax element pps_subpic_id[i]. The value of syntax element pps_subpic_id_len_minus1 is in the range of 0 to 15, inclusive. It can be a requirement of bitstream conformance that the value of syntax element pps_subpic_id_len_minus1 is the same for all PPSs that are referred to by coded pictures in a CLVS.

pps_subpic_id[i] specifies the subpicture ID of the i-th subpicture. The length of the syntax element pps_subpic_id[i] is pps_subpic_id_len_minus1+1 bits.

ph_subpic_id_signaling_present_flag equal to 1 specifies that subpicture mapping is signaled in the PH; syntax element ph_subpic_id_signaling_present_flag equal to 0 specifies that subpicture ID mapping is not signaled in the PH.

ph_subpic_id_len_minus1 plus 1 specifies the number of bits used to represent the syntax element ph_subpic_id[1]. The value of syntax element pic_subpic_id_len_minus1 can be in the range of 0 to 15, inclusive. It can be a requirement of bitstream conformance that the value of syntax element ph_subpic_id_len_minus1 is the same for all PHs that are referred to by coded pictures in a CLVS.

ph_subpic_id[i] specifies that subpicture ED of the i-th subpicture. The length of the syntax element ph_subpic_id[i] is ph_subpic_id_len_minus1+1 bits.

After parsing these syntax elements related to subpicture ID, subpicture ID list SubpicIdList is derived using the following Syntax (1):

```
for( i = 0; i <= sps_num_subpics_minus1; i++ )
    SubpicIdList[ i ] = sps_subpic_id_present_flag ?         Syntax (1)
      ( sps_subpic_id_signaling_present_flag ?
      sps_subpic_id[ i ] :
      ( ph_subpic_id_signaling_present_flag ?
      ph_subpic_id[ i ] : pps_subpic_id[ i ] ) ) : i
```

However, there are several problems with the above described signaling of subpicture partitioning. First, according to the semantics, both syntax elements sps_subpic_id_present_flag and sps_subpic_id_signaling_present_flag specify whether the subpicture ID is present in SPS. And according to Table 2, only when both of these two syntax elements are true, the subpicture id information is signaled in SPS. Thus, there is redundancy in the signaling. Second, even when sps_subpics_id_present_flag is true, the subpicture ID can also be signaled in PPS or PH when pps_subpic_id_signalling_present_flag or ph_subpic_id_signalling_present_flag is true. Third, according to Syntax (1), when sps_subpic_id_present_flag is not true, a default ID which is equal to the subpicture index is assigned to each subpicture. when sps_subpic_id_present_flag is true, the SubpicIdList [i] is derived as either sps_subpic_id[i], ph_subpic_id[i] or pps_subpic_id[i]. However, it is possible that the subpicture ID is not present in SPS, PPS, or PH when sps_subpic_id_present_flag is true, so an undefined value of syntax element pps_subpic_id is assigned to SubpicIdList in this case. In Syntax (1), when syntax element sps_subpic_id_present_flag is true, syntax elements sps_subpic_id_signaling_present_flag and ph_subpic_id_signaling_present_flag are both false, and syntax element pps_subpic_id[i] is assigned to SubpicIdList[i] regardless of the value of syntax element pps_subpic_id_signaling_present_flag. If syntax element ps_subpic_id_signaling_present_flag is false, syntax element pps_subpic_id[i] is undefined.

Moreover, as shown in Table 1 of FIG. 10, when syntax element subpics_present_flag is true, the number of subpictures is signaled first, followed by the top-left position, width and height of each subpicture and two controlling flags subpic_treated_as_pic_flag and loop_filter_across_subpic_enabled_flag. Even in the case of only one subpicture (when syntax element sps_num_subpics_minus1 is equal to 0), the top-left position, width and height, and these two controlling flags are signaled. However, it is unnecessary to indicate these things because the subpicture is equal to the picture when there is only one subpicture in the picture, so that the information signaled can be derived from the picture itself.

Moreover, subpicture is obtained by dividing the picture, and the picture is formed by merging all the subpictures. The position and the size of the last subpicture can be derived from the size of the whole picture and all previous subpicture positions and sizes. Thus, there is no need to signal the position, width and height information of the last subpicture.

Moreover, as shown in Table 2 of FIG. 11, syntax element sps_subpic_id_present_flag is always signaled regardless of the value of syntax element subpics_present_flag. Thus, in the above described signaling methods, even if subpicture is not present, the subpicture identifier may be still signaled, which is meaningless.

The present disclosure provides signaling methods to solve the above problems. Some exemplary embodiments are described below in detail.

In some embodiments of the present disclosure, subpicture ID can be forced to be signaled in picture header if syntax element sps_subpic_id_present_flag is true but both of syntax elements sps_subpic_id_signaling_present_flag and pps_subpic_id_signaling_present_flag are false. This can avoid the case in which subpicture ID is not defined.

For example, a bitstream conformance constraint may be imposed in the following two ways. In the first way, the semantics for the bitstream conformance constraint are (emphases in italics): ph_subpic_id_signalling_present_flag equal to 1 specifies that subpicture ID mapping is signaled in the PH. Syntax element ph_subpic_id_signaling_present_flag equal to 0 specifies that subpicture ID mapping is not signaled in the PH. It can be a bitstream conformance requirement that, when syntax element sps_subpic_id_present_flag is equal to 1, syntax element sps_subpic_id_signaling_present_flag is equal to 0 and syntax element pps_subpic_id_signaling_present_flag is equal to 0, the value of syntax element ph_subpic_id_signaling_present_flag is 1.

In the second way, the semantics for the bitstream conformance constraint are (emphases in italics): ph_subpic_id_signaling_present_flag equal to 1 specifies that subpicture ID mapping is signaled in the PH. Syntax element ph_subpic_id_signaling_present_flag equal to 0 specifies that subpicture ID mapping is not signaled in the PH. It can be a bitstream conformance requirement that, when syntax element sps_subpic_id_signaling_present_flag is equal 1 and syntax element sps_subpic_id_signaling_present_flag is equal to 0 and syntax element pps_subpic_id_signaling_present_flag in all of the PPS referred to by the coded pictures in a CLVS are equal to 0, there is at least one PH, of all the PH that are rete red to by the coded pictures in a CLVS referring; in which the value of syntax element ph_subpic_id_signaling_present_flag is equal to 1.

Figure 14:
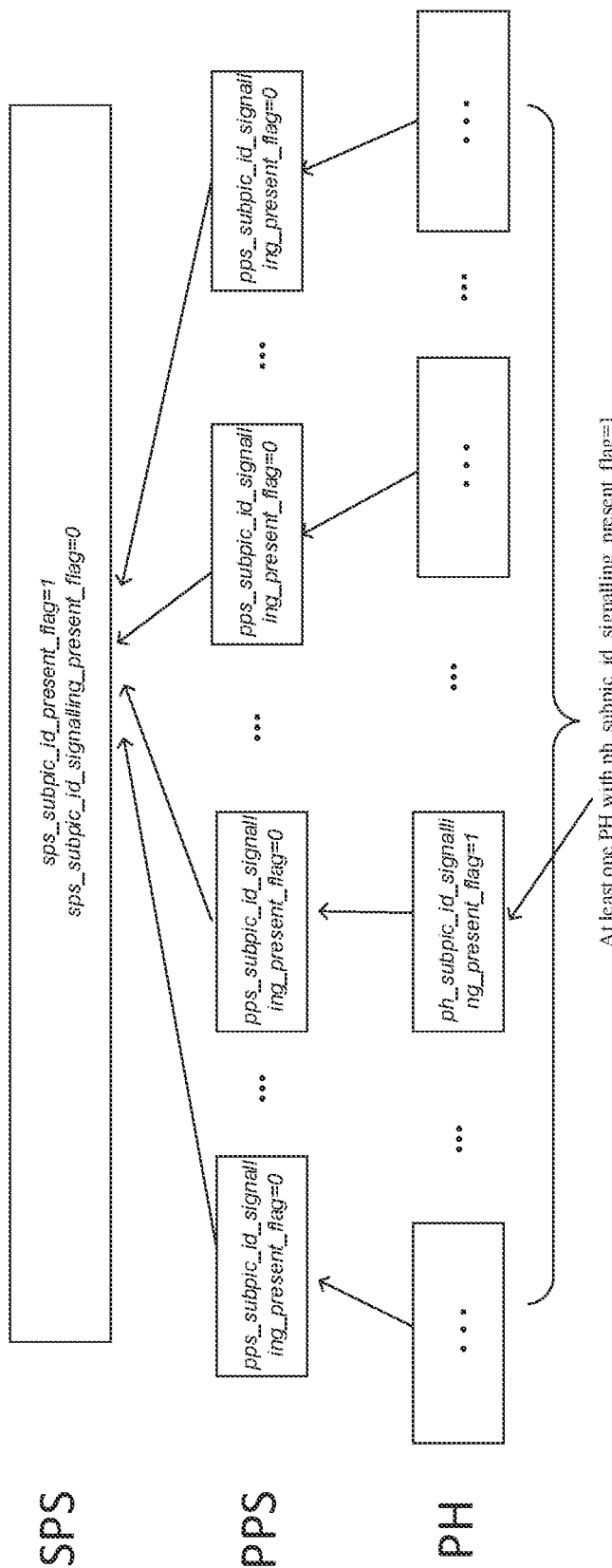
FIG. 14 is a schematic diagram illustrating an exemplary bitstream conformance constraint, according to some embodiments of the present disclosure.

FIG. 14 is a schematic diagram illustrating an exemplary bitstream conformance constraint in the second way, according to some embodiments of the present disclosure.

The semantics of syntax element sps_subpic_id_present_flag are not clearly defined in the current VW draft and can be changed as follows (emphases in italics).

sps_subpic_id_present_flag equal to 1 specifies that subpicture ID mapping is present in the SPS, PPS or PH. Syntax element sps_subpic_id_present_flag equal to 0 specifies that subpicture ID mapping is not present in the SPS, PPS and PH.

This can guarantee that syntax element ph_subpic_id is signaled when syntax element sps_subpic_id_present_flag is true but both of syntax elements sps_subpic_id_signaling_present_flag and pps_subpic_id_signaling_present_flag are false. The syntax is shown in Tables 2-4 of FIGS. 11-13.

In the embodiments above, if subpicture ID present flag is true (syntax element sps_subpic_id_present_flag=1), the subpicture ID used is signaled in the bitstream (either in SPS, PPS or PH) and no inference rule is needed. When subpicture ID present flag is true (syntax element sps_subpic_id_present_flag=1), forcing subpicture ID to be signaled in one of SPS, PPS or PH may be better than using inference rule to derive the subpicture ID but without signaling subpicture ID in the bitstream since syntax element sps_subpic_id_present_flag indicates the subpicture ID is present.

As another example, FIG. 15 illustrates an exemplary Table 5 showing another exemplary PH syntax of subpicture identifier, according to some embodiments of the present disclosure. Table 5 shows a modification (shown in box 1501 and emphasized in italics) of the PH syntax shown in Table 4. Referring to Table 5, When syntax element sps_subpic_id_present_flag is true but both of syntax elements sps_subpic_id_signaling_present_flag and pps_subpic_id_signaling_present_flag are false, syntax element ph_subpic_id is forced to be signaled by inferring syntax element ph_sub_pic_id_signaling_present_flag to be true.

The syntax element ph_subpic_id_signaling_present_flag can have the following two alternative semantics (emphases in italics).

The first semantics include (emphases in italics): ph_subpic_id_signaling_present_flag equal to 1 specifies that subpicture ID mapping is signaled in the PH. Syntax element ph_subpic_id_signaling_present_flag equal to 0 specifies that subpicture ID mapping is not signaled in the PH. When not present, the value of syntax element ph_subpic_id_signaling_present_flag is interred to be 1.

The second semantics include (emphases in italics): ph_subpic_id_signaling_present_flag equal to 1 specifies that subpicture ID mapping is signaled in the PH; syntax element ph_subpic_id_signaling_present_flag equal to 0 specifies that subpicture ID mapping is not signaled in the PH. When not present, if syntax element sps_subpic_id_present_flag is equal to 1 and syntax element sps_subpic_id_signaling_present_flag is equal to 0 the value of syntax element ph_subpic_id_signaling_present_flag is interred to be 1.

The semantics of syntax element sps_subpic_id_present_flag can be changed as follows (emphases in italics).

sps_subpic_id_present_flag equal to 1 specifies that subpicture ID mapping is present in the SPS, PPS or PH. Syntax element sps_subpic_id_present_flag equal to 0 specifies that subpicture ID mapping is not present in the SPS, PPS and PH.

Inference rule of subpicture ID is not needed in some embodiments when syntax element sps_subpic_id_present_flag is true. Therefore, the signaling of syntax element ph_subpic_id_signaling_present_flag is skipped when the subpicture ID present flag is true (syntax element sps_subpic_id_present_flag=1) but the subpicture ID is not signaled in SPS or PPS (syntax element sps_subpic_id_signaling_present_flag=0 and syntax element pps_subpic_id_signaling_present_flag=0). Then, 1 bit can be saved.

As another example, syntax element ph_subpic_id is forced to be signaled if syntax element sps_subpic_id_present_flag is true but both of syntax elements sps_subpic_id_signaling_present_flag and pps_subpic_id_signaling_present_flag are false (i.e., subpicture ID is not signaled in SPS or PPS), which means the subpicture ID is signaled in PH in this case. In a case that syntax element pps_subpic_id is signaled (syntax element sps_subpic_id_present_flag is true, syntax element sps_subpic_id_signaling_present_flag is false, and syntax element pps_subpic_id_signaling_present_flag is true), syntax element ph_subpic_id cannot be signaled. FIG. 16 illustrates an exemplary Table 6 showing another exemplary PH syntax of subpicture identifier (emphases shown in box 1601 and highlighted in italics), according to some embodiments of the present disclosure.

The list SubpicIdList[i] is derived according to Syntax (2) as follows:

```
for( i = 0; i <= sps_num_subpics_minus1; i++ )
    SubpicIdList[ i ] = sps_subpic_id_present_flag ?         Syntax (2)
        ( sps_subpic_id_signaling_present_flag ?
        sps_subpic_id[ i ] :
        ( pps_subpic_id_signaling_present_flag ?
        pps_subpic_id[ i ] : ph_subpic_id[ i ] ) ) : i
```

Inference rule of subpicture ID is not needed in some embodiments when syntax element sps_subpic_id_present_flag is true. Syntax element ph_subpic_id_signaling_present_flag can be removed. Therefore, one bit is saved in the case that syntax element sps_subpic_id_present_flag is equal to 1, syntax element sps_subpic_id_signaling_present_flag, is equal to 0 and syntax element pps_subpic_id_signaling_present_flag is equal to 1.

In the case that subpicture ID is already signaled in the PPS, some embodiments can give an option for encoder to override the subpicture in PPS by signaling subpicture ID in PH again. It is a more flexible way for encoder.

In some embodiments of the present disclosure, an inference rule is given to guarantee the subpicture ID list SubpicIdList can be derived.

As an example, an inference rule is given to syntax element pps_subpic_id, so that when subpicture ID is not signaled in SPS, PPS or PH, the default value of syntax element pps_subpic_id which is inferred by the inference rule is used to derive subpicture ID list SubpicIdList.

The semantics of syntax element pps_subpic_id are as follows (emphases in italics): pps_subpic_id[i] specifies the subpicture ID of the i-th subpicture. The length of the syntax element pps_subpic_id[i] is pps_subpic_id_len_minus1 bits. When not present, the value of syntax element pps_subpic_id[i] is it erred to be i, for each i in the range of 0 to pps_num_subpics_minus1.

As another example, the inference rule is given in the derivation process of SubpicIdList. When syntax element sps_subpic_id_present_flag is true, syntax elements sps_subpic_id_signaling_present_flag, pps_subpic_id_signaling_present_flag and ph_subpic_id_signaling_present_flag are all false, a default value is assigned to SubpicIdList[i].

The derivation of SubpicIdList is according to Syntax (3) as follows (emphases in italics):

```
for( i = 0; i <= sps_num_subpics_minus1; i++ )
    SubpicIdList[ i ] = sps_subpic_id_present_flag ?         Syntax (3)
        ( sps_subpic_id_signaling_present_flag ?
        sps_subpic_id[ i ] :
        ( ph_subpic_id_signaling_present_flag ?
        ph_subpic_id[ i ] :
    ( pps_subpic_id_signaling_present_flag
    ?pps_subpic_id[ i ] : i ) ) ) : i
```

In some embodiments, by imposing the inference rule to either pps_subpic_id, it can be guaranteed that the SubpicIdList can be derived even without signaling of subpicture ID in the bitstream at all. Therefore, the bits dedicated to signaling the subpicture ID may be saved.

In some embodiments of the present disclosure, derivation rule of the subpicture ID list SubpicIdList can be changed to give higher priority to subpicture ID signaled in PPS than PH. Therefore, syntax element pps_subpic_id_signaling_present_flag is checked before syntax element ph_subpic_id_signaling_present_flag.

As an example, the derivation rule of SubpicIDList is according to Syntax (4), as shown below (emphases in italics), and an inference rule is given for syntax element ph_subpic_id

```
for( i = 0; i <= sps_num_subpics_minus1; i++ )
    SubpicIdList[ i ] = sps_subpic_id_present_flag ?         Syntax (4)
        ( sps_subpic_id_signaling_present_flag ?
        sps_subpic_id[ i ] :
        ( pps_subpic_id_signaling_present_flag ?
        pps_subpic_id[ i ] : ph_subpic_id[ i ] ) ) : i
```

The semantics consistent with Syntax (4) are (emphases in italics): ph_subpic_id[i] specifies that subpicture ID of the i-th subpicture. The length of the syntax element ph_subpic_id[i] is ph_subpic_id_len_minus1+1 bits. When not present, the value of syntax element ph_subpic_id[i] is inferred to be i, for each i in the range of 0 to ph_num_subpics_minus1.

As another example, the derivation rule SubpicIDList is according to Syntax (5), as shown below (et phases in italics), and no additional inference rule for syntax element ph_subpic_id in this example.

```
for( i = 0; i <= sps_num_subpics_minus1; i++ )
    SubpicIdList[ i ] = sps_subpic_id_present_flag ?         Syntax (5)
        ( sps_subpic_id_signaling_present_flag ?
        sps_subpic_id[ i ] :
        ( pps_subpic_id_signaling_present_flag
        ?pps_subpic_id[ i ] :
    ( ph_subpic_id_signaling_present_flag
    ?ph_subpic_id[ i ] : i ) ) ) : i
```

An inference rule is given either to syntax element ph_subpic_id or SubpicIdList derivation process to guarantee the SubpicIdList can be correctly derived even without signaling subpicture ID in the bitstream at all. Therefore, in the case of default subpicture ID inferred by inference rule being used, the bits dedicated to the subpicture signaling may be saved.

In some embodiments of the present disclosure, redundant information signaled for subpicture when the number of the subpicture is equal to one can be removed.

As an example, the SPS syntax is shown in Table 7A of FIG. 17A (emphases shown in boxes 1701-1702 and highlighted in italics) or Table 7B of FIG. 17B (emphases shown in boxes 1711-1712 and highlighted in italics). It is appreciated that Table 7A and Table 7B are equivalent. The semantics (emphases in italics) consistent with the syntax in Table 7A and Table 7B are shown below.

subpic_ctu_top_left_x[i] specifies horizontal position of top left CTU of i-th subpicture in unit of CtbSizeY. The length of the syntax element is Ceil(Log 2(pic_width_max_in_luma_samples÷CtbSizeY)) bits. When not present, the value of syntax element subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log 2(pic_height_max_in_luma_samples÷CtbSizeY)) bits. When not present, the value of syntax element subpic_ctu_top_left_y[i] is inferred to be equal to 0.

subpic_width_minus1[i] plus 1 specifies the width of the i-th subpicture in units of CtbSizeY. The length of the syntax element is Ceil(Log 2(pic_width_max_in_luma_samples÷CtbSizeY)) bits. When not present, the value of syntax element subpic_width_minus1[i] is inferred to be equal to Ceil (pic_width_max_in_luma_samples÷CtbSizeY)−1. Here, "Ceil( )" is a function to round up to the nearest integer number. Thus, Ceil (pic_width_max_in_luma_samples÷CtbSizeY)−1 is equal to (pic_width_max_in_luma_samples+CtbSizeY−1)/CtbSizeY−1 where "/" is a integer division.

subpic_height_minus1[i] plus 1 specifies the height of the i-th subpicture in units of CtbSizeY. The length of the syntax element is Ceil(Log 2(pic_height_max_in_luma_samples÷CtbSizeY)) bits. When not present, the value of syntax element subpic_height_minus1[i] is inferred to be equal to Ceil (pic_height_max_in_luma_samples÷CtbSizeY)−1. Here, "Ceil( )" is a function to round up to the neartest integer number. Thus, Ceil (pic_height_max_in_luma_samples÷CtbSizeY)−1 is equal to (pic_height_max_in_luma_samples+CtbSizeY−1)/CtbSizeY−1 where "/" is a integer division.

subpic_treated_as_pic_flag[i] equal to 1 specifies that the i-th subpicture of each coded picture in the CLVS is treated as a picture in the decoding process excluding in-loop filtering operations. Syntax element subpic_treated_as_pic_flag[i] equal to 0 specifies that the i-th subpicture of each coded picture in the CLVS is not treated as a picture in the decoding process excluding in-loop filtering operations. when not present, syntax element subpics_present_flag is equal to 1 and syntax element sps_num_subpics_minus1 is equal to 0, the value of syntax element subpic_treated_as_pic_flag[i] is inferred to be equal to 1; otherwise the value of syntax element subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CLVS. Syntax element loop_filter_across_subpic_enabled_flag[i] equal to 0 specifies that in-loop filtering operations are not performed across the boundaries of the i-th subpicture in each coded picture in the CLVS. when not present, syntax element subpics_present_flag is equal to 1 and syntax element sps_num_subpics_minus1 is equal to 0, the value of syntax element loop_filter_across_subpic_enabled_flag[i] is in inferred to be equal to 0; otherwise the value of syntax element loop_filter_across_subpic_enabled_pic_flag[i] is inferred to be equal to 1.

As another example, the SPS syntax is shown in Table 8 (emphases shown in boxes 1801-1802 and highlighted in italics) of FIG. 18. The semantics (emphases in italics) consistent with the syntax in Table 8 are described below.

subpic_ctu_top_left_x[i] specifies horizontal position of top left CTU of i-th subpicture in unit of CtbSizeY. The length of the syntax element is Ceil(Log 2(pic_width_max_in_luma_samples÷CtbSizeY)) bits. When not present, the value of syntax element subpic_ctu_top_left_x[i] is interred to be equal to 0.

subpic_ctu_top_left_y[i] specifies vertical position of top left CTU of i-th subpicture in unit of CtbSizeY. The length of the syntax element is Ceil(Log 2(pic_height_max_in_luma_samples÷CtbSizeY)) bits. When not present, the value of syntax element subpic_ctu_top_left_y[i] is inferred to be equal to 0.

subpic_width_minus1[i] plus 1 specifies the width of the i-th subpicture in units of CtbSizeY. The length of the syntax element is Ceil(Log 2(pic_width_max_in_luma_samples÷CtbSizeY)) bits. When not present, the value of syntax element subpic_width_minus1[i] is inferred to be equal to Ceil ((pic_width_max_in_luma_samples÷CtbSizeY)−1. Here, "Ceil( )" is a function to round up to the neartest integer number. Thus, Ceil (pic_width_max_in_luma_samples÷CtbSizeY)−1 is equal to (pic_width_max_in_luma_samples+CtbSizeY−1)/CtbSizeY−1 where "/" is a integer division.

subpic_height_minus1[i] plus 1 specifies the height of the i-th subpicture in units of CtbSizeY. The length of the syntax element is Ceil(Log 2(pic_height_max_in_luma_samples÷CtbSizeY)) bits. When not present, the value of syntax element subpic_height_minus1[i] is inferred to be equal to Ceil (pic_height_max_in_luma_samples÷CtbSizeY)−1. Here, "Ceil( )" is a function to round up to the neartest integer number. Thus, Ceil (pic_height_max_in_luma_samples÷CtbSizeY)−1 is equal to (pic_height_max_in_luma_samples+CtbSizeY−1)/CtbSizeY−1 where "/" is a integer division.

In some embodiments of the present disclosure, the position and/or size information of the last subpicture can be skipped and derived from the size of the whole picture and the size and position of all previous subpicture. FIG. 19 illustrates an exemplary Table 9 showing another exemplary SPS syntax, according to some embodiments of the present disclosure. In Table 9 (emphases shown in boxes 1901-1902 and highlighted in italics), the width and height of the last subpicture which is the subpicture with the index equal to syntax element sps_num_subpics_minus1 is skipped.

The width and height of the last subpicture are derived from the width and height of the whole picture and the top-left position of the last subpicture.

Following are semantics phases in italics) consistent with the syntax in Table 9.

subpic_ctu_top_left_x[i] specifies horizontal position of top left CTU of i-th subpicture in unit of CtbSizeY. The length of the syntax element is Ceil(Log 2(pic_height_max_in_luma_samples÷(CtbSizeY)) bits. When not present, the value of syntax element subpic_ctu_top_left_x [i] is inferred to be equal to 0.

subpic_ctu_top_left_y[i] specifies vertical position of top left CTU of i-th subpicture in unit of CtbSizeY. The length of the syntax element is Ceil(Log 2(pic_height_max_in_luma_samples÷CtbSizeY)) bits. When not present, the value of syntax element subpic_ctu_top_left_y[i] is inferred to be equal to 0.

subpic_width_minus1[i] plus 1 specifies the width of the i-th subpicture in units of CtbSizeY. The length of the syntax element is Ceil(Log 2(pic_width_max_in_luma_samples÷CtbSizeY)) bits. When not present, the value of syntax element subpic_width_minus1[i] is inferred to be equal to Ceil ((pic_width_max_in_luma_samples÷CtbSizeY)−1−(i==sps_num_subpics_minus1?subpic_ctu_top_left_x [sps_num_subpics_minus1]:0). Here, "Ceil( )" is a function to round up to the nearest integer number. That is, Ceil (pic_width_max_in_luma_samples÷CtbSizeY)−1 is equal to (pic_width_max_in_luma_samples+CtbSizeY−1)/CtbSizeY−1 where "/" is a integer division. "sps_num_subpics_minus1" is the number of the subpictures in the picture. For the last subpicture in the picture, i is equal to sps_num_subpics_minus1, and in this case subpic_width_minus1[i] is inferred to be equal to (pic_width_max_in_luma_samples+CtbSizeY−1)/CtbSizeY−1−subpic_ctu_top_left_x[sps_num_subpics_minus1]. When there is only one subpicture in the picture, i can only be 0 and subpic_ctu_top_left_x[0] is 0. Thus, subpic_width_minus1[i] is inferred to be equal to (pic_width_max_in_luma_samples+CtbSizeY−1)/CtbSizeY−1−subpic_ctu_top_left_x[0] or (pic_width_max_in_luma_samples+CtbSizeY−1)/CtbSizeY−1.

subpic_height_minus1[i] plus 1 specifies the height of the i-th subpicture in units of CtbSizeY. The length of the syntax element is Ceil(Log 2(pic_height_max_in_luma_samples÷CtbSizeY)) bits. When not present, the value of syntax element subpic_height_minus1[sps_num_subpics_minus1] is inferred to be equal to (Ceil(pic_height_max_in_luma_samples)÷CtbSizeY)−1−(i==sps_num_suhpics_minus1? subpic_ctu_top_left_y[i]:0). Here, "Ceil( )" is a function to round up to the nearest integer number. That is, Ceil (pic_height_max_in_lama_samples÷CtbSizeY)−1 is equal to (pic_height_max_in_luma_samples+CtbSizeY−1)/CtbSizeY−1 where "/" is a integer division. "sps_num_subpics_minus1" is the number of the subpictures in the picture. For the last subpicture in the picture, i is equal to sps_num_subpics_minus1, and in this case subpic_height_minus1[i] is inferred to be equal to (pic_height_max_in_luma_samples+CtbSizeY−1)/CtbSizeY−1−subpic_ctu_top_left_y[sps_num_subpics_minus1]. When there is only one subpicture in the picture, i can only be 0 and subpic_ctu_top_left_y[0] is 0. Thus, subpic_width_minus1[i] is inferred to be equal to (pic_height_max_in_luma_samples+CtbSizeY−1)/CtbSizeY−1−subpic_ctu_top_left_y[0] or (pic_height_max_in_luma_samples+CtbSizeY−1)/CtbSizeY−1.

In some embodiments of the present disclosure, subpicture ID is signaled only when subpicture is present. FIG. 20 illustrates an exemplary Table 10 showing another exemplary SPS syntax (emphases shown in boxes 2001-2002 and highlighted in italics), according to some embodiments of the present disclosure.

Figure 21:
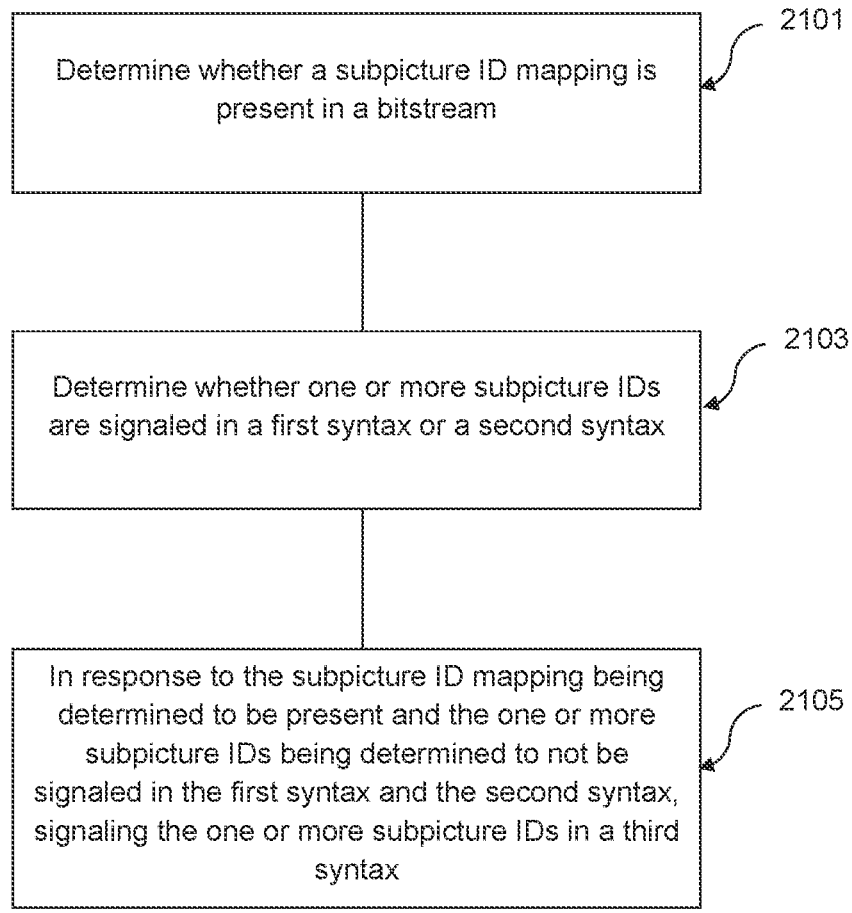
FIG. 21 illustrates a flowchart of an exemplary video processing method, according to some embodiments of the present disclosure.

FIG. 21 illustrates a flowchart of an exemplary video processing method 2100, according to some embodiments of the present disclosure. Method 2100 can be performed by an encoder (e.g., by process 200A of FIG. 2A or 200B of FIG. 2B), a decoder (e.g., by process 300A of FIG. 3A or 300B of FIG. 3B or performed by one or more software or hardware components of an apparatus (e.g., apparatus 400 of FIG. 4). For example, a processor (e.g., processor 402 of FIG. 4) can perform method 2100. In some embodiments, method 2100 can be implemented by a computer program product, embodied in a computer-readable medium, including computer-executable instructions, such as program code, executed by computers (e.g., apparatus 400 of FIG. 4).

At step 2101, a determination can be made on whether a subpicture ID mapping is present in a bitstream. In some embodiments, method 2100 can include signaling a flag indicating whether a subpicture ED mapping is present in the bitstream. For example, the flag can be sps_subpic_id_present_flag as shown in Table 2 of FIG. 11, Table 4 of FIG. 13, Table 5 of FIG. 15, or Table 6 of FIG. 16.

At step 2103, a determination can be made on whether one or more subpicture IDs are signaled in a first syntax or a second syntax. At step 2105, in response to the subpicture ID mapping being determined to be present and the one or more subpicture IDs being determined to not be signaled in the first syntax and the second syntax, the one or more subpicture IDs is signaled in a third syntax. The first syntax, second syntax, or third syntax is one of a SPS, a PPS, and a PH. For example, the first syntax, second syntax, are third syntax are a SPS, a PPS, and a PH, respectively. Thus, when the subpicture ID mapping is present (e.g., sps_subpic_id_present_flag=1), subpicture IDs can be forced to be signaled in either SPS, PPS or PH.

In some embodiments, method 2100 can include signaling a first flag (e.g., sps_subpic_id_signaling_present_flag as shown in Table 2 of FIG. 11, Table 5 of FIG. 15 or Table 6 of FIG. 16) indicating that the one or more subpicture IDs are signaled in the first syntax (e.g., SPS as shown in Table 2 of FIG. 11). In some embodiments, method 2100 can include signaling a second flag (e.g., pps_subpic_id_signaling_present_flag as shown in Table 3 of FIG. 12, Table 5 of FIG. 15 or Table 6 of FIG. 16) indicating that the one or more subpicture IDs are signaled in the second syntax (e.g., PPS as shown in Table 3 of FIG. 12). In some embodiments, method 2100 can include signaling a third flag (e.g., ph_subpic_id_signaling_present_flag as shown in Table 5 of FIG. 15) indicating that the one or more subpicture IDs are signaled in the third syntax e. PH as shown in Table 5 of FIG. 15).

In some embodiments, method 2100 can include: determining whether the bitstream includes a third flag indicating that the one or more subpicture IDs are signaled in the third syntax, and in response to the bitstream not including the third flag, signaling the one or more subpicture IDs in the third syntax. For example, the third syntax can be PH, and the third flag can be ph_subpic_id_signaling_present_flag. When ph_subpic_id_signaling_present_flag is not signaled in PH, it can be inferred to be 1 and the one or more subpicture IDs are signaled in the PH.

In some embodiments, method 2100 can include in response to the one or more subpicture IDs being determined to be not signaled in the first syntax, signaling the one or more subpicture IDs in the second syntax and the third syntax (e.g., Table 5 of FIG. 15).

Figure 22:
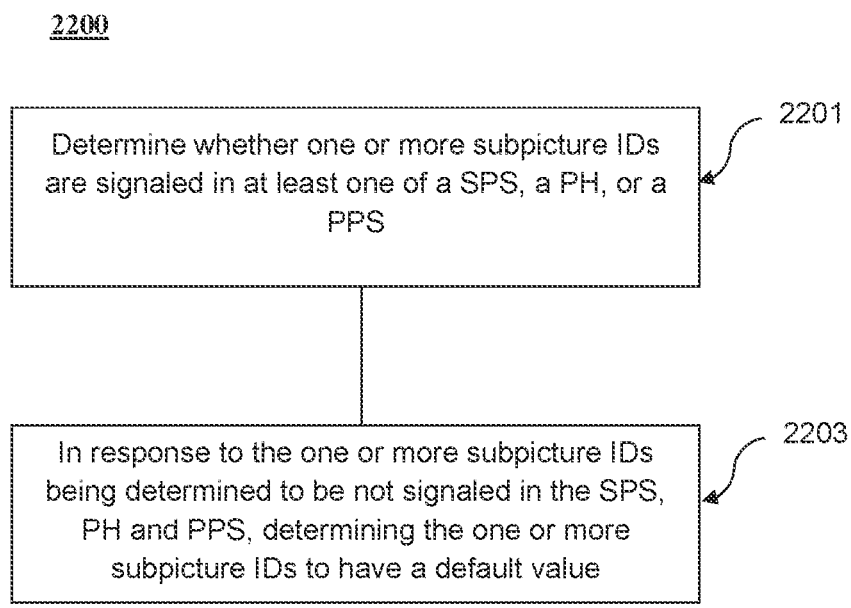
FIG. 22 illustrates a flowchart of another exemplary video processing method, according to some embodiments of the present disclosure.

FIG. 22 illustrates a flowchart of an exemplary video processing method 2200, according to some embodiments of the present disclosure. Method 2200 can be performed by an encoder (e.g., by process 200A of FIG. 2A or 200B of FIG. 2B), a decoder by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2200. In some embodiments, method 2200 can be implemented by a computer program product, embodied in a computer-readable medium, including computer-executable instructions, such as program code, executed by computers (e.g., apparatus 400 of FIG. 4).

At step 2201, a determination can be made on whether one or more subpicture IDs are signaled in at least one of a SPS, a PH, or a PPS. In some embodiments, method 2200 can include determining whether the one or more subpicture IDs are signaled in the PH before determining whether the one or more subpicture IDs are signaled in the PPS. In some embodiments, method 2200 can include determining whether the one or more subpicture Ds are signaled in the PPS before determining whether the one or more subpicture IDs are signaled in the PH.

At step 2203, in response to the one or more subpicture IDs being determined to be not signaled in the SPS, PH and PPS, the one or more subpicture IDs can be determined to have a default value.

Figure 23:
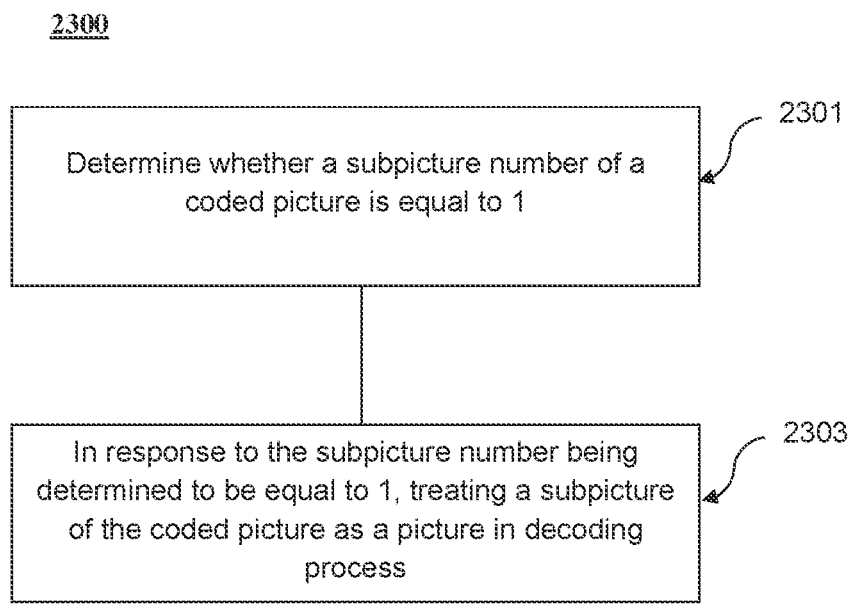
FIG. 23 illustrates a flowchart another exemplary video processing method, according to some embodiments of the present disclosure.

FIG. 23 illustrates a flowchart of an exemplary video processing method 2300, according to some embodiments of the present disclosure. Method 2300 can be performed by an encoder (e.g., by process 200A of FIG. 2A or 200B of FIG. 2B), a decoder (e.g., by process 300A of FIG. 3A or 300B of FIG. 38) or performed by one or more software or hardware components of an apparatus (e.g., apparatus 400 of FIG. 4). For example, a processor (e.g., processor 402 of FIG. 4) can perform method 2300. In some embodiments, method 2300 can be implemented by a computer program product, embodied in a computer-readable medium, including computer-executable instructions, such as program code, executed by computers (e.g., apparatus 400 of FIG. 4).

At step 2301, a determination can be made on whether a subpicture number of a coded picture is equal to 1. For example, as shown in Table 8 of FIG. 18, a determination can be made on whether sps_num_subpic_minus1 is larger than 0.

At step 2303, in response to the subpicture number being determined to be equal to 1, a subpicture of the coded picture can be treated as a picture in decoding process. For example, in response to the subpicture number being determined to be equal to 1, a flag subpic_treated_as_pic_flag[i] can be inferred to be equal to 1. In some embodiments, in response to the subpicture number being determined to be equal to 1, in-loop filtering operations can be excluded.

Figure 24:
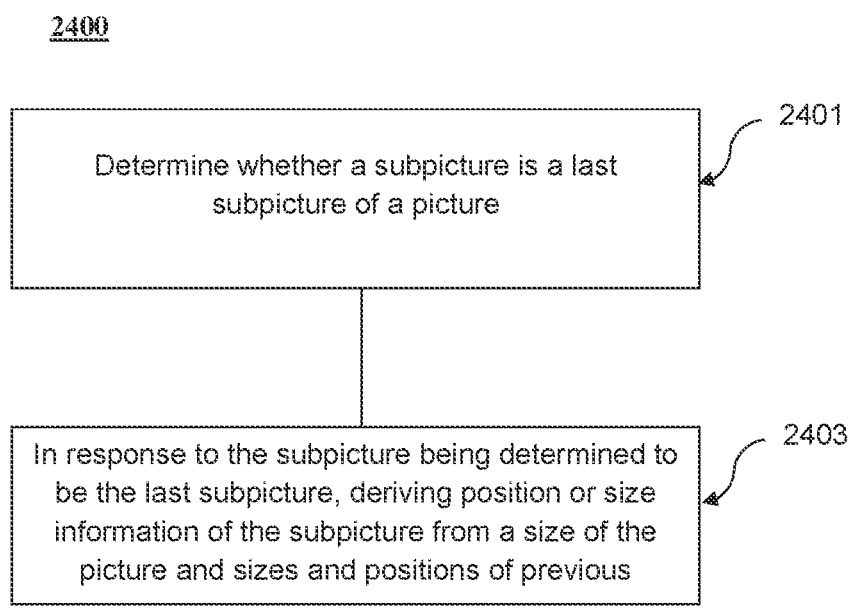
FIG. 24 illustrates a flowchart of another exemplary video processing method, according to some embodiments of the present disclosure.

FIG. 24 illustrates a flowchart of an exemplary video processing method 2400, according to some embodiments of the present disclosure. Method 2400 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2400. In some embodiments, method 2400 can be implemented by a computer program product, embodied in a computer-readable medium, including computer-executable instructions, such as program code, executed by computers (e.g., apparatus 400 of FIG. 4).

At step 2401, a determination can be made on whether a subpicture is a last subpicture of a picture. At step 2403, in response to the subpicture being determined to be the last subpicture, position or size information of the subpicture can be derived from a size of the picture and sizes and positions of previous subpictures of the picture.

Figure 25:
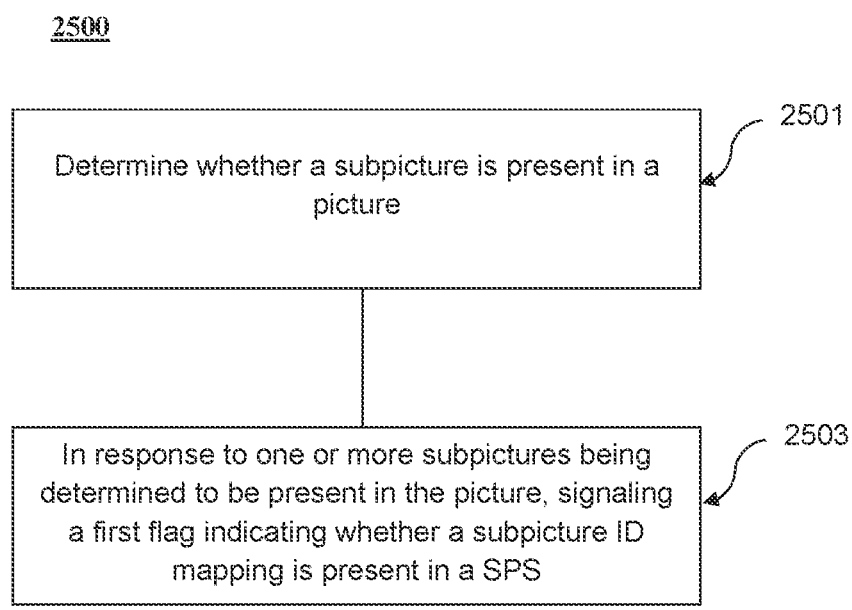
FIG. 25 illustrates a flowchart of another exemplary video processing method, according to some embodiments of the present disclosure.

FIG. 25 illustrates a flowchart of an exemplary video processing method 2500, according to some embodiments of the present disclosure. Method 2500 can be performed by an encoder (by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2500. In some embodiments, method 2500 can be implemented by a computer program product, embodied in a computer-readable medium, including computer-executable instructions, such as program code, executed by computers (e.g., apparatus 400 of FIG. 4).

At step 2501, a determination can be made on whether a subpicture is present in a picture. For example, this determination can be made based on a flag (e.g., subpics_present_flag as shown in Table 10 of FIG. 20).

At step 2503, in response to one or more subpictures being determined to be present in the picture, a first flag indicating whether a subpicture ID mapping is present in a SPS can be signaled. For example, the first flag can be sps_subpic_id_present_flag as shown in Table 10 of FIG. 20.

In some embodiments, method 2500 can include in response to the first flag indicating that a subpicture ID mapping is present in the SPS, signaling a second flag indicating whether the subpicture ID mapping is signaled in the SPS. In response to the second flag indicating that the subpicture ID mapping is signaled in the SPS, subpicture IDs of the one or more subpictures can be signaled in the SPS. For example, the second flag can be sps_subpic_id_signaling_present_flag as shown in Table 10 of FIG. 20. When sps_subpic_id_signaling_present_flag is true, sps_subpic_id[i] can be signaled.

The embodiments may further be described using the following clauses:

1. A video processing method, comprising:
   determining whether a subpicture ID mapping is present in a bitstream;
   determining whether one or more subpicture IDs are signaled in a first syntax or a second syntax; and
   in response to the subpicture ID mapping being determined to be present and the one or more subpicture IDs being determined to not be signaled in the first syntax and the second syntax, signaling the one or more subpicture IDs in a third syntax.

2. The method of clause 1, wherein the first syntax, second syntax, or third syntax is one of a sequence parameter set (SPS), a picture parameter set (PPS), and a picture header (PH).

3. The method of any one of clauses 1 and 2, further comprising:
   signaling a first flag indicating that the one or more subpicture IDs are signaled in the first syntax; or
   signaling a second flag indicating that the one or more subpicture IDs are signaled in the second syntax.

4. The method of any one of clauses 1-3, further comprising:
   signaling a third flag indicating that the one or more subpicture IDs are signaled in the third syntax.

5. The method of any one of clauses 1-4 further comprising:
   determining whether the bitstream includes a third flag indicating that the one or more subpicture IDs are signaled in the third syntax; and
   in response to the bitstream not including the third flag, signaling the one or more subpicture IDs in the third syntax.

6. The method of any one of clauses 1-5, further comprising:
   in response to the one or more subpicture IDs being determined to be not signaled in the first syntax, signaling the one or more subpicture IDs in the second syntax and the third syntax.

7. The method of any one of clauses 1-6, further comprising:
   signaling a fourth flag indicating whether a subpicture ID mapping is present in the bitstream.

8. A video processing apparatus, comprising:
   at least one memory for storing instructions; and
   at least one processor configured to execute the instructions to cause the apparatus to perform:
   determining whether a subpicture ID mapping is present in a bitstream;
   determining whether one or more subpicture IDs are signaled in a first syntax or a second syntax; and
   in response to the subpicture ID mapping being determined to be present and the one or more subpicture IDs being determined to not be signaled in the first syntax and the second syntax, signaling the one or more subpicture IDs in a third syntax.

9. The apparatus of clause 8, wherein the first syntax, second syntax, or third syntax is one of a sequence parameter set (SPS), a picture parameter set (PPS), and a picture header (PH).

10. The apparatus of any one of clauses 8 and 9, wherein the at least one processor is configured to execute the instructions to cause the apparatus to perform:
    signaling a first flag indicating that the one or more subpicture IDs are signaled in the first syntax; or
    signaling a second flag indicating that the one or more subpicture IDs are signaled in the second syntax.

11. The apparatus of any one of clauses 8-10, wherein the at least one processor is configured to execute the instructions to cause the apparatus to perform:
    signaling a third flag indicating that the one or more subpicture IDs are signaled in the third syntax.

12. The apparatus of any one of clauses 8-11, wherein the at least one processor is configured to execute the instructions to cause the apparatus to perform:
    determining whether the bitstream includes a third flag indicating that the one or more subpicture IDs are signaled in the third syntax; and
    in response to the bitstream not including the third flag, signaling the one or more subpicture IDs in the third syntax.

13. The apparatus of any one of clauses 8-12, wherein the at least one processor is configured to execute the instructions to cause the apparatus to perform:
    in response to the one or more subpicture IDs being determined to be not signaled in the first syntax, signaling the one or more subpicture IDs in the second syntax and the third syntax.

14. The apparatus of any one of clauses 8-13, wherein the at least one processor is configured to execute the instructions to cause the apparatus to perform:
    signaling a fourth flag indicating whether a subpicture ID mapping is present in the bitstream.

15. A non-transitory computer readable storage medium storing a set of instructions that are executable by one or more processing devices to cause a video processing apparatus to perform a method comprising:
    determining whether a subpicture ID mapping is present in a bitstream;
    determining whether one or more subpicture IDs are signaled in a first syntax or a second syntax; and
    in response to the subpicture ID mapping being determined to be present and the one or more subpicture IDs being determined to not be signaled in the first syntax and the second syntax, signaling the one or more subpicture IDs in a third syntax.

16. The non-transitory computer readable storage medium of clause 15, wherein the first syntax, second syntax, or third syntax is one of a sequence parameter set (SPS), a picture parameter set (PPS), and a picture header (PH).

17. The non-transitory computer readable storage medium of any one of clauses 15 and 16, wherein the set of instructions are executable by the one or more processing devices to cause the video processing apparatus to perform:
signaling a first flag indicating that the one or more subpicture Ds are signaled in the first syntax; or
signaling a second flag indicating that the one or more subpicture IDs are signaled in the second syntax.

18. The non-transitory computer readable storage medium of any one of clauses 15-17, wherein the set of instructions are executable by the one or more processing devices to cause the video processing apparatus to perform:
signaling a third flag indicating that the one or more subpicture IDs are signaled in the third syntax.

19. The non-transitory computer readable storage medium of any one of clauses 15-18, wherein the set of instructions are executable by the one or more processing devices to cause the video processing apparatus to perform:
determining whether the bitstream includes a third flag indicating that the one or more subpicture IDs are signaled in the third syntax; and
in response to the bitstream not including the third flag, signaling the one or more subpicture IDs in the third syntax.

20. The non-transitory computer readable storage medium of any one of clauses 15-19, wherein the set of instructions are executable by the one or more processing devices to cause the video processing apparatus to perform:
in response to the one or more subpicture IDs being determined to be not signaled in the first syntax, signaling the one or more subpicture IDs in the second syntax and the third syntax.

21. The non-transitory computer readable storage medium of any one of clauses 15-20, wherein the set of instructions are executable by the one or more processing devices to cause the video processing apparatus to perform:
signaling a fourth flag indicating whether a subpicture ID mapping is present in the bitstream.

22. A video processing method, comprising:
determining whether one or more subpicture IDs are signaled in at least one of a sequence parameter set (SPS), a picture header (PH), or a picture parameter set (PPS); and
in response to the one or more subpicture IDs being determined to be not signaled in the SPS, PH and PPS, determining the one or more subpicture IDs to have a default value.

23. The method of clause 22, wherein determining whether the one or more subpicture IDs are signaled in the PH is performed before determining whether the one or more subpicture IDs are signaled in the PPS.

24. The method of clause 22, wherein determining whether the one or more subpicture IDs are signaled in the PPS is performed before determining whether the one or more subpicture IDs are signaled in the PH.

25. A video processing method, comprising:
determining whether a subpicture number of a coded picture is equal to 1; and
in response to the subpicture number being determined to be equal to 1, treating a subpicture of the coded picture as a picture in decoding process.

26. The method of clause 25, further comprising:
in response to the subpicture number being determined to be equal to 1, excluding in-loop filtering operations.

27. A video processing method, comprising:
determining whether a subpicture is a last subpicture of a picture; and in response to the subpicture being determined to be the last subpicture, deriving position or size information of the subpicture from a size of the picture and sizes and positions of previous subpictures of the picture.

28. A video processing method, comprising:
determining whether a subpicture is present in a picture; and
in response to one or more subpictures being determined to be present in the picture, signaling a first flag indicating whether a subpicture ID mapping is present in a sequence parameter set (SPS).

29. The method of clause 28, further comprising:
in response to the first flag indicating that a subpicture ID mapping is present in the SPS, signaling a second flag indicating whether the subpicture ID mapping is signaled in the SPS.

30. The method of clause 29, further comprising:
in response to the second flag indicating that the subpicture ID mapping is signaled in the SPS, signaling subpicture IDs of the one or more subpictures in the SPS.

31. A video processing apparatus, comprising:
at least one memory for storing instructions; and
at least one processor configured to execute the instructions to cause the apparatus to perform:
determining whether one or more subpicture IDs are signaled in at least one of a sequence parameter set (SPS), a picture header (PH), or a picture parameter set (PPS); and
in response to the one or more subpicture IDs being determined to be not signaled in the SPS, PH and PPS, determining the one or more subpicture s to have a default value.

32. The apparatus of clause 31, wherein the at least one processor is configured to execute the instructions to cause the apparatus to perform determining whether the one or more subpicture IDs are signaled in the PH before determining whether the one or more subpicture IDs are signaled in the PPS.

33. The apparatus of clause 31, wherein the at least one processor is configured to execute the instructions to cause the apparatus to perform determining whether the one or more subpicture IDs are signaled in the PPS before determining whether the one or more subpicture IDs are signaled in the PH.

34. A video processing apparatus, comprising:
at least one memory for storing instructions; and
at least one processor configured to execute the instructions to cause the apparatus to perform:
determining whether a subpicture number of a coded picture is equal to 1; and
in response to the subpicture number being determined to be equal to 1, treating a subpicture of the coded picture as a picture in decoding process.

35. The apparatus of clause 34, wherein the at least one processor is configured to execute the instructions to cause the apparatus to perform:
in response to the subpicture number being determined to be equal to 1, excluding in-loop filtering operations.

36. A video processing apparatus, comprising:
at least one memory for storing instructions; and
at least one processor configured to execute the instructions to cause the apparatus to perform:
determining whether a subpicture is a last subpicture of a picture; and
in response to the subpicture being determined to be the last subpicture, deriving position or size information of the subpicture from a size of the picture and sizes and positions of previous subpictures of the picture.

37. A video processing apparatus, comprising:
at least one memory for storing instructions; and
at least one processor configured to execute the instructions to cause the apparatus to perform:
determining whether a subpicture is present in a picture; and
in response to one or more subpictures being determined to be present in the picture, signaling a first flag indicating whether a subpicture ID mapping is present in a sequence parameter set (SPS).

38. The apparatus of clause 37, wherein the at least one processor is configured to execute the instructions to cause the apparatus to perform:
in response to the first flag indicating that a subpicture ID mapping is present in the SPS, signaling a second flag indicating whether the subpicture ID mapping is signaled in the SPS.

39. The apparatus of clause 38, wherein the at least one processor is configured to execute the instructions to cause the apparatus to perform:
in response to the second flag indicating that the subpicture ID mapping is signaled in the SPS, signaling subpicture IDs of the one or more subpictures in the SPS.

40. A non-transitory computer readable storage medium storing a set of instructions that are executable by one or more processing devices to cause a video processing apparatus to perform a method comprising:
determining whether one or more subpicture IDs are signaled in at least one of a sequence parameter set (SPS), a picture header (PH), or a picture parameter set (PPS); and
in response to the one or more subpicture IDs being determined to be not signaled in the SPS, PH and PPS, determining the one or more subpicture IDs to have a default value.

41. The non-transitory computer readable storage medium of clause 40, wherein the set of instructions are executable by the one or more processing devices to cause the video processing apparatus to perform determining whether the one or more subpicture IDs are signaled in the PH before determining whether the one or more subpicture IDs are signaled in the PPS.

42. The non-transitory computer readable storage medium of clause 40, wherein the set of instructions are executable by the one or more processing devices to cause the video processing apparatus to perform determining whether the one or more subpicture IDs are signaled in the PPS before determining whether the one or more subpicture IDs are signaled in the PH.

43. A non-transitory computer readable storage medium storing a set of instructions that are executable by one or more processing devices to cause a video processing apparatus to perform a method comprising:
determining whether a subpicture number of a coded picture is equal to 1; and
in response to the subpicture number being determined to be equal to 1, treating a subpicture of the coded picture as a picture in decoding process.

44. The non-transitory computer readable storage medium of clause 43, wherein the set of instructions are executable by the one or more processing devices to cause the video processing apparatus to perform:
in response to the subpicture number being determined to be equal to 1, excluding in-loop filtering operations.

45. A non-transitory computer readable storage medium storing a set of instructions that are executable by one or more processing devices to cause a video processing apparatus to perform a method comprising:
determining whether a subpicture is a last subpicture of a picture; and
in response to the subpicture being determined to be the last subpicture, deriving position or size information of the subpicture from a size of the picture and sizes and positions of previous subpictures of the picture.

46. A non-transitory computer readable storage medium storing a set of instructions that are executable by one or more processing devices to cause a video processing apparatus to perform a method comprising:
determining whether a subpicture is present in a picture; and
in response to one or more subpictures being determined to be present in the picture, signaling a first flag indicating whether a subpicture ID mapping is present in a sequence parameter set (SPS).

47. The non-transitory computer readable storage medium of clause 46, wherein the set of instructions are executable by the one or more processing devices to cause the video processing apparatus to perform:
in response to the first flag indicating that a subpicture ID mapping is present in the SPS, signaling a second flag indicating whether the subpicture ID mapping is signaled in the SPS.

48. The non-transitory computer readable storage medium of clause 47, wherein the set of instructions are executable by the one or more processing devices to cause the video processing apparatus to perform:
in response to the second flag indicating that the subpicture ID mapping is signaled in the SPS, signaling subpicture IDs of the one or more subpictures in the SPS.

49. A video processing method, comprising:
determining, according to a subpicture information present flag signaled in a bitstream, whether the bitstream comprises subpicture information; and
in response to the bitstream comprising the subpicture information, signaling in the bitstream at least one of:
a number of subpictures in a picture,
a width, a height, a position, and an identifier (ID) mapping of a target subpicture,
a subpic_treated_as_pic_flag, and
a loop_filter_across_subpic_enabled_flag.

50. The method of clause 49, wherein the signaling of at least one of the width, the height, and the position of the target subpicture is based on the number of the subpictures in the picture.

51. The method of clause 50, further comprising:
signaling the subpic_treated_as_pic_flag, the loop_filter_across_subpic_enabled_flag; and at least one of the width, the height, and the position of the target subpicture, when there are at least two subpictures in the picture, wherein:
the signaling of the at least one of the width, the height, and the position of the target subpicture is skipped when there is only one subpicture in the picture,
the subpic_treated_as_pic_flag indicates whether subpictures of each coded picture in a coded layer video sequence (CLVS) are treated as a picture in a decoding process excluding in-loop filtering operations, and
the loop_filter_across_subpic_enabled_flap indicates whether in-loop filtering operations across subpicture boundaries are enabled across subpicture boundaries of each coded picture in the CLVS.

52. The method of clause 51, further comprising:
when the width of the target subpicture is not signaled, determining a value of the width of the target subpicture as a width of the picture; and
when the height of the target subpicture is not signaled, determining a value of the height of the target subpicture as a height of the picture.

53. The method of clause 52, further comprising:
when the width of the target subpicture is not signaled, determining a value of the width of the target subpicture in a unit of coding tree block (CTB) size as a width of the picture in the unit of CTB size; and
when the height of the target subpicture is not signaled, determining a value of the height of the target subpicture in the unit of CTB size as a height of the picture in the unit of CTB size.

54. The method of clause 51, further comprising:
determining that the subpic_treated_as_pic_flag has a value of 1, when the subpic_treated_as_pic_flag is not signaled in the bitstream; and
determining that the loop_filter_across_subpic_enabled_flag has a value of 0, when the loop_filter_across_subpic_enabled_flag is not signaled in the bitstream.

55. The method of clause 49, further comprising:
skipping signaling at least one of the width and the height of the target subpicture, when the target subpicture is a last subpicture in the picture.

56. The method of clause 55, further comprising:
when the width of the target subpicture is not signaled, determining a value of the width of the target subpicture in a unit of coding tree block (CTB) size as a width of the picture in the unit of CTB size minus a horizontal position of a top left coding tree unit (CTU) of the target subpicture in the unit of CTB size, or determining the value of the width of the target subpicture as a width of the picture minus a horizontal position of a top left coding tree unit (CTU) of the target subpicture; and
when the height of target subpicture is not signaled, determining a value of the height of the target subpicture in the unit of CTB size as a height of the picture in the unit of CTB size minus a vertical position of the top left CTU of the target subpicture in the unit of CTB size, or determining a value of the height of the target subpicture as a height of the picture minus a vertical position of the top left CTU of the target subpicture.

57. The method of clause 49, wherein signaling the ID mapping of the target subpicture further comprises:
signaling a first flag in the bitstream; and
in response to that the first flag being equal to 1, signaling the ID mapping of the target subpicture in a first data unit or a second data unit,
wherein the first flag equal to 0 indicates that the ID mapping of the target subpicture is not signaled in the bitstream.

58. The method of clause 57, further comprising:
in response to that the first flag is equal to 1 and the ID mapping of the target subpicture is not signaled in the first data unit, signaling the ID mapping of the target subpicture in the second data unit; or
in response to that the first flag is equal to 0 or the ID mapping of the target subpicture is signaled in the first data unit, skip signaling the ID mapping of the target subpicture in the second data unit.

59. The method of clause 58, wherein each of the first data unit and the second data unit is one of a sequence parameter set (SPS), a picture parameter set (PPS), or a picture header (PH).

60. A video processing apparatus, comprising:
at least one memory for storing instructions; and
at least one processor configured to execute the instructions to cause the apparatus to perform:
determining, according to a subpicture information present flag signaled in a bitstream, whether the bitstream comprises subpicture information; and
in response to the bitstream comprising the subpicture information, signaling in the bitstream at least one of:
a number of subpictures in a picture,
a width, a height, a position, and an identifier (ID) mapping of a target subpicture,
a subpic_treated_as_pic_flag, and
a loop_filter_across_subpic_enabled_flag.

61. The apparatus of clause 60, wherein the signaling of at least one of the width, the height, and the position of the target subpicture is based on the number of the subpictures in the picture.

62. The apparatus of clause 61, wherein the at least one processor is configured to execute the instructions to cause the apparatus to perform:
signaling the subpic_treated_as_pic_flag, the loop_filter_across_subpic_enabled_flag, and at least one of the width, the height, and the position of the target subpicture, when there are at least two subpictures in the picture, wherein:
the signaling of the at least one of the width, the height, and the position of the target subpicture is skipped when there is only one subpicture in the picture,
the subpic_treated_as_pic_flag indicates whether subpictures of each coded picture in a coded layer video sequence (CLVS) are treated as a picture in a decoding process excluding in-loop filtering operations, and
the loop_filter_across_subpic_enabled_flag indicates whether in-loop filtering operations across subpicture boundaries are enabled across subpicture boundaries of each coded picture in the CLVS.

63. The apparatus of clause 62, wherein the at least one processor is configured to execute the instructions to cause the apparatus to perform:
when the width of the target subpicture is not signaled, determining a value of the width of the target subpicture as a width of the picture; and
when the height of the target subpicture is not signaled, determining a value of the height of the target subpicture as a height of the picture.

64. The apparatus of clause 63, wherein the at least one processor is configured to execute the instructions to cause the apparatus to perform:
when the width of the target subpicture is not signaled, determining a value of the width of the target subpicture in a unit of coding tree block (CTB) size as a width of the picture in the unit of CTB size; and
when the height of the target subpicture is not signaled determining a value of the height of the target subpicture in the unit of CUB size as a height of the picture in the unit of CTB size.

65. The apparatus of clause 62, wherein the at least one processor is configured to execute the instructions to cause the apparatus to perform:
determining that the subpic_treated_as_pic_flag has a value of 1, when the subpic_treated_as_pic_flag is not signaled in the bitstream; and
determining that the loop_filter_across_subpic_enabled_flag has a value of 0, when the loop_filter_across_subpic_enabled_flag is not signaled in the bitstream.

66. The apparatus of clause 60, wherein the at least one processor is configured to execute the instructions to cause the apparatus to perform:

skipping signaling at least one of the width and the height of the target subpicture, when the target subpicture is a last subpicture in the picture.

67. The apparatus of clause 66, wherein the at least one processor is configured to execute the instructions to cause the apparatus to perform:

when the width of the target subpicture is not signaled, determining a value of the width of the target subpicture in a unit of coding tree block (CTB) size as a width of the picture in the unit of CTB size minus a horizontal position of a top left coding tree unit (CTU) of the target subpicture in the unit of CTB size, or determining the value of the width of the target subpicture as a width of the picture minus a horizontal position of a top left coding tree unit (CTU) of the target subpicture; and when the height of target subpicture is not signaled, determining a value of the height of the target subpicture in the unit of CTB size as a height of the picture in the unit of CTB size minus a vertical position of the top left CTU of the target subpicture in the unit of CTB size, or determining a value of the height of the target subpicture as a height of the picture minus a vertical position of the top left CTU of the target subpicture.

68. A non-transitory computer readable storage medium storing a set of instructions that are executable by one or more processing devices to cause a video processing apparatus to perform a method comprising:

determining, according to a subpicture information present flag signaled in a bitstream, whether the bitstream comprises subpicture information; and in response to the bitstream comprising the subpicture information, signaling in the bitstream at least one of:
  a number of subpictures in a picture,
  a width, a height, a position, and an identifier (ID) mapping of a target subpicture,
  a subpic_treated_as_pic_flag, and
  a loop_filter_across_subpic_enabled_flag.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method implemented in a decoder, comprising:

determining, according to a subpicture information present flag signaled in a bitstream, whether the bitstream comprises subpicture information;

in response to the bitstream comprising the subpicture information, decoding in the bitstream at least one of:
  a number of subpictures in a picture,
  a width, a height, a position, an identifier (ID) mapping of a target subpicture,
  a subpic_treated_as_pic_flag, and
  a loop_filter_across_subpic_enabled_flag; and skipping decoding at least one of the width and the height of the target subpicture, when the target subpicture is a last subpicture in the picture.

2. The method of claim 1, wherein the decoding of at least one of the width, the height, and the position of the target subpicture is based on the number of the subpictures in the picture.

3. The method of claim 2, further comprising:

decoding the subpic_treated_as_pic_flag, the loop_filter_across_subpic_enabled_flag, and at least one of the width, the height, and the position of the target subpicture, when there are at least two subpictures in the picture, wherein:
the decoding of the at least one of the width, the height, and the position of the target subpicture is skipped when there is only one subpicture in the picture,
the subpic_treated_as_pic_flag indicates whether subpictures of each coded picture in a coded layer video sequence (CLVS) are treated as a picture in a decoding process excluding in-loop filtering operations, and
the loop_filter_across_subpic_enabled_flag indicates whether in-loop filtering operations across subpicture boundaries are enabled across subpicture boundaries of each coded picture in the CLVS.

4. The method of claim 3, further comprising:
when the width of the target subpicture is not signaled, determining a value of the width of the target subpicture as a width of the picture; and
when the height of the target subpicture is not signaled, determining a value of the height of the target subpicture as a height of the picture.

5. The method of claim 4, further comprising:
when the width of the target subpicture is not signaled, determining a value of the width of the target subpicture in a unit of coding tree block (CTB) size as a width of the picture in the unit of CTB size; and
when the height of the target subpicture is not signaled, determining a value of the height of the target subpicture in the unit of CTB size as a height of the picture in the unit of CTB size.

6. The method of claim 3, further comprising:
determining that the subpic_treated_as_pic_flag has a value of 1, when the subpic_treated_as_pic_flag is not signaled in the bitstream; and
determining that the loop_filter_across_subpic_enabled_flag has a value of 0, when the loop_filter_across_subpic_enabled_flag is not signaled in the bitstream.

7. The method of claim 1, further comprising:
when the width of the target subpicture is not signaled, determining a value of the width of the target subpicture in a unit of coding tree block (CTB) size as a width of the picture in the unit of CTB size minus a horizontal position of a top left coding tree unit (CTU) of the target subpicture in the unit of CTB size, or determining the value of the width of the target subpicture as a width of the picture minus a horizontal position of a top left coding tree unit (CTU) of the target subpicture; and
when the height of target subpicture is not signaled, determining a value of the height of the target subpicture in the unit of CTB size as a height of the picture in the unit of CTB size minus a vertical position of the top left CTU of the target subpicture in the unit of CTB size, or determining a value of the height of the target subpicture as a height of the picture minus a vertical position of the top left CTU of the target subpicture.

8. The method of claim 1, wherein decoding the ID mapping of the target subpicture further comprises:
decoding a first flag in the bitstream; and
in response to that the first flag being equal to 1, decoding the ID mapping of the target subpicture in a first data unit or a second data unit,
wherein the first flag equal to 0 indicates that the ID mapping of the target subpicture is not signaled in the bitstream.

9. The method of claim 8, further comprising:
in response to that the first flag is equal to 1 and the ID mapping of the target subpicture is not signaled in the first data unit, decoding the ID mapping of the target subpicture in the second data unit; or
in response to that the first flag is equal to 0 or the ID mapping of the target subpicture is signaled in the first data unit, skip decoding the ID mapping of the target subpicture in the second data unit.

10. The method of claim 9, wherein each of the first data unit and the second data unit is one of a sequence parameter set (SPS), a picture parameter set(PPS), or a picture header (PH).

11. A video processing apparatus implemented in an encoder, comprising:
at least one memory for storing instructions; and
at least one processor configured to execute the instructions to cause the apparatus to perform:
determining, according to a subpicture information present flag signaled in a bitstream, whether the bitstream comprises subpicture information; and
in response to the bitstream comprising the subpicture information, signaling in the bitstream at least one of:
a number of subpictures in a picture,
a width, a height, a position, an identifier (ID) mapping of a target subpicture,
a subpic_treated_as_pic_flag, and
a loop_filter_across_subpic_enabled_flag; and
skipping signaling at least one of the width and the height of the target subpicture, when the target subpicture is a last subpicture in the picture.

12. The apparatus of claim 11, wherein the signaling of at least one of the width, the height, and the position of the target subpicture is based on the number of the subpictures in the picture.

13. The apparatus of claim 12, wherein the at least one processor is configured to execute the instructions to cause the apparatus to perform:
signaling the subpic_treated_as_pic_flag, the loop_filter_across_subpic_enabled_flag, and at least one of the width, the height, and the position of the target subpicture, when there are at least two subpictures in the picture, wherein:
the signaling of the at least one of the width, the height, and the position of the target subpicture is skipped when there is only one subpicture in the picture,
the subpic_treated_as_pic_flag indicates whether subpictures of each coded picture in a coded layer video sequence (CLVS) are treated as a picture in a decoding process excluding in-loop filtering operations, and
loop_filter_across_subpic_enabled_flag indicates whether in-loop filtering operations across subpicture boundaries are enabled across subpicture boundaries of each coded picture in the CLVS.

14. The apparatus of claim 13, wherein the at least one processor is configured to execute the instructions to cause the apparatus to perform:
when the width of the target subpicture is not signaled, determining a value of the width of the target subpicture as a width of the picture; and
when the height of the target subpicture is not signaled, determining a value of the height of the target subpicture as a height of the picture.

15. The apparatus of claim 14, wherein the at least one processor is configured to execute the instructions to cause the apparatus to perform:

when the width of the target subpicture is not signaled, determining a value of the width of the target subpicture in a unit of coding tree block (CTB) size as a width of the picture in the unit of CTB size; and when the height of the target subpicture is not signaled determining a value of the height of the target subpicture in the unit of CTB size as a height of the picture in the unit of CTB size.

16. The apparatus of claim 13, wherein the at least one processor is configured to execute the instructions to cause the apparatus to perform:

determining that the subpic_treated_as_pic_flag has a value of 1, when the subpic_treated_as_pic_flag is not signaled in the bitstream; and determining that theloop_filter_across_subpic_enabled_flag has a value of 0, when the loop_filter_across_subpic_enabled_flag is not signaled in the bitstream.

17. The apparatus of claim 11, wherein the at least one processor is configured to execute the instructions to cause the apparatus to perform:

when the width of the target subpicture is not signaled, determining a value of the width of the target subpicture in a unit of coding tree block (CTB) size as a width of the picture in the unit of CTB size minus a horizontal position of a top left coding tree unit (CTU) of the target subpicture in the unit of CTB size, or determining the value of the width of the target subpicture as a width of the picture minus a horizontal position of a top left coding tree unit (CTU) of the target subpicture; and when the height of target subpicture is not signaled, determining a value of the height of the target subpicture in the unit of CTB size as a height of the picture in the unit of CTB size minus a vertical position of the top left CTU of the target subpicture in the unit of CTB size, or determining a value of the height of the target subpicture as a height of the picture minus a vertical position of the top left CTU of the target subpicture.

18. A non-transitory computer readable storage medium storing a bitstream of a video for processing according to a method comprising:

determining, according to a subpicture information present flag signaled in the bitstream, whether the bitstream comprises subpicture information;

in response to the bitstream comprising the subpicture information, signaling in the bitstream at least one of:
a number of subpictures in a picture,
a width, a height, a position, an identifier (ID) mapping of a target subpicture,
a subpic_treated_as_pic_flag, and
a loop_filter_across_subpic_enabled_flag; and skipping signaling at least one of the width and the height of the target subpicture, when the target subpicture is a last subpicture in the picture.

* * * * *